United States Patent [19]
Wright et al.

[11] Patent Number: 6,078,568
[45] Date of Patent: Jun. 20, 2000

[54] MULTIPLE ACCESS COMMUNICATION NETWORK WITH DYNAMIC ACCESS CONTROL

[75] Inventors: Andrew S. Wright; Cuong Hon Lai, both of Vancouver, Canada

[73] Assignee: Telefonaktiebolaget LM Ericsson, Stockholm, Sweden

[21] Appl. No.: 08/806,081

[22] Filed: Feb. 25, 1997

[51] Int. Cl.[7] .................................................. H04L 7/00
[52] U.S. Cl. ........................................ 370/312; 370/445
[58] Field of Search .................................. 370/312, 337, 370/347, 349, 445, 447, 252

[56] References Cited

U.S. PATENT DOCUMENTS

| | | | |
|---|---|---|---|
| 4,817,087 | 3/1989 | Yamada | 370/445 |
| 5,008,883 | 4/1991 | Eizenhofer et al. | |
| 5,537,395 | 7/1996 | Alles et al. | 370/349 |
| 5,570,367 | 10/1996 | Ayanoglu et al. | 370/349 |
| 5,604,869 | 2/1997 | Mincher et al. | |
| 5,701,302 | 12/1997 | Geiger | 370/521 |
| 5,740,167 | 4/1998 | Taketsugu et al. | 370/337 |

FOREIGN PATENT DOCUMENTS

| | | |
|---|---|---|
| 0 405 844 B1 | 1/1991 | European Pat. Off. |
| 0 465 090 B1 | 1/1992 | European Pat. Off. |
| 0 524 671 A1 | 1/1993 | European Pat. Off. |
| 91/09366 | 6/1991 | WIPO . |
| 96/15609 | 5/1996 | WIPO . |

Primary Examiner—Hassan Kozou
Assistant Examiner—Daniel Previl
Attorney, Agent, or Firm—Myers Bigel Sibley & Sajovec

[57] ABSTRACT

Dynamic access control for communicating a data packet over a multiple access communication network with a forward channel and a multiple access reverse channel which maintains utilization even when the arrival rate of packets for transmission exceeds the departure rate is provided by a broadcast dynamic access control parameter which regulates access to the multiple access reverse channel. A subscriber device wishing to transmit a data packet on the reverse channel receives the broadcast dynamic access control parameter from a base station on the network, generates an access control limit value and only attempts to transmit the data packet if the access control limit value satisfies the dynamic access control parameter. The dynamic access control parameter is updated by the base station based on a determined success rate and collision rate for transmissions on the reverse channel. The change rate for the dynamic access control parameter is based upon the determined success rate and a target success rate and the change direction is based on the determined collision rate and a target collision rate. Each reverse channel has an associated dynamic access control parameter and congested ones of the reverse channels are identified based on the value of the respective dynamic access control parameter and routing of data packets on the network is allocated to reduce demand on congested reverse channels.

13 Claims, 25 Drawing Sheets

MULTIPLE ACCESS COMMUNICATION NETWORK WITH DYNAMIC ACCESS CONTROL

FIELD OF THE INVENTION

This invention relates to communication networks and more particularly to packet based communication networks with multiple access communication channels having contention mode communications.

BACKGROUND OF THE INVENTION

Packet data systems are typically used for communications networks and a variety of protocols have developed to regulate transmission and receipt of data packets on such networks. As long as the ideal error-free communication channel has not been realized, data communication on such networks generally allows, among other things, for retransmission of data when errors are detected. Various protocols governing data transmission have evolved in an attempt to allow reliable data communications and to maximize network utilization. The need for optimizing channel utilization becomes even more pronounced where a heavily utilized wireless communication network such as a cellular or PCS system or a wire line network comprises a portion of the data communications network.

Typical packet data systems include a forward channel, generally referred to as a downlink (from base to portable) in a wireless network, and a reverse channel, typically referred to as an uplink (from portable to base) in a wireless network. The forward (or downlink) channel is typically a constant stream of data messages which are broadcast from a base station to a population of listening subscriber devices. The forward channel is a one to many broadcast channel. The reverse channel (or uplink) is shared by the population of subscriber devices and, as a consequence, is often referred to as a many-to-one channel. This immediately highlights that the access to the reverse channel by the subscribers must be carefully managed due to the risk of multiple devices attempting to use the channel at the same instant, which results in collisions and a waste of the available bandwidth. The difficulty of channel management is exacerbated because a "listen before transmission" policy is generally hampered because the subscriber population is geographically distributed. As a consequence, subscribers may not ascertain if the reverse channel is currently being utilized by another subscriber. This is known as the hidden terminal problem.

Packet data multiple access protocols are generally classified into two categories: contention protocols (such as Aloha and CSMA) or packet reservation protocols (such as PRMA). When employed in a digital packet radio system, these systems generally employ control flags that are broadcast on the forward channel to inform the population of subscriber devices the status of the reverse channel. This approach eliminates the hidden terminal problem since all subscribers receive the forward channel. Contention schemes usually utilize a small window in which access is permitted. If a single transmission occurs, the control flags inform the remaining members of the subscriber population not to transmit, allowing the channel to become dedicated to the transmitting subscriber. However, if two transmissions occur at the same instant a collision occurs and channel bandwidth is wasted.

Packet reservation schemes manage the available channel bandwidth by either polling each subscriber in turn and dedicating the reverse channel if the subscriber has messages to transmit, or by providing a predefined periodic short contention window portion of each block in which very short reservation requests may be transmitted. Upon receipt of a successful reservation request, the channel will be allocated to the specific subscriber. The reservation transmission is regarded as very efficient since wastage due to subscriber transmission collisions generally does not occur.

In general, both categories of multiple access protocols have significant system advantages and disadvantages. The typical construction of an Aloha Contention Protocol is illustrated in FIG. 1. As illustrated in FIG. 1, synchronization words are imbedded in the forward channel at regular intervals which, in turn, delineate the reverse channel into dedicated transmission slots. A subscriber device is permitted to transmit a data packet in any slot. As a consequence, the utilization of a slot may be classified as a success, idle, or collision. A collision is defined when energy is present within slot boundaries but fails to decode which indicates that one or more transmissions from different devices probably occurred. Idle slots are devoid of energy from subscriber transmissions and successful receipt of a transmission burst from a subscriber indicates successful utilization of a slot. Collision and idle slots represent a waste of available reverse channel bandwidth.

Aloha type contention schemes generally provide for inefficient reverse channel utilization where long data packet transmissions such as file transfers are regularly encountered on the network. Such systems are also prone to instability with increasing access rates resulting in increased collisions followed by an increase in retransmission attempts which effectively continues to increase the demand on the network. Back-off policies are typically provided to reduce the risk of system instability. Aloha systems do, however, allow the use of slow receive to transmit switching time devices thereby allowing the use of low cost, half-duplex hardware.

A second type of contention scheme is a carrier sense multiple access (CSMA) protocol, the operations of which are illustrated in FIG. 2. Embedded in the forward channel is a sequence of control flags. Each control flag delineates the reverse channel into a sequence of collision windows and in addition indicates whether the reverse channel is currently being utilized (busy/idle) by a subscriber device. A subscriber device which has an outstanding data packet(s) for transmission determines if the channel is busy or idle prior to transmission. Furthermore, if the channel is sensed to be idle, the transmission occurs such that the reverse channel synchronization word is received by the base station prior to the transmission of the next busy/idle flag. This requirement ensures that the base station is able to set the busy/idle flag to busy, thereby protecting the remaining segments of the reverse channel subscriber transmission from interference from other subscriber devices that may have outstanding data packets ready for transmission. The technique allows the subscriber device to transmit variable length messages on the reverse channel without contending for the channel for each packet that requires transmission. Collisions may, however, occur during the collision window when the channel may be sensed to be idle by multiple subscribers with outstanding packets.

A further variant on the CSMA protocol is available if full duplex is employed. A subscriber device communicating on the reverse channel can then monitor the forward channel during the transmission of a set of data packets. The forward channel control device such as the base station can then alert a subscriber device if a collision has occurred and preempt termination of the transmission thereby conserving reverse channel bandwidth that may then be exploited by a different subscriber device. This approach is typically referred to as CSMA/CD (collision detect).

A disadvantage of the CSMA scheme is the need for fast receive to transmit switching times which typically means this protocol is inappropriate for use with inexpensive devices which may be desirable, particularly in a wireless environment. As CSMA is fundamentally a contention scheme, a back-off policy is typically provided as with Aloha due to the risk of system instability. An additional disadvantage of CSMA schemes is that they typically provide relatively poor channel utilization for a very short transmission packet environments.

An example of a packet reservation type multiple access is illustrated in FIG. 3. The Packet Reservation Multiple Access (PRMS) schemes are typically characterized by the partitioning of the reverse channel into a polling region and a reservation/data region. The polling region includes short slots, with each slot dedicated to a specific subscriber or device. A device utilizes this slot to announce to the system that it has outstanding data packets and that it requires a data slot to be reserved. If the forward channel device determines that a specific data slot within the reservation region is not utilized then it may allocate the particular data slot to a requesting reverse channel device for transmission of the outstanding frames. Ordinarily, a single data slot is commensurate with the largest possible packet or transmission block. A reverse channel device may identify that the reverse channel has been exclusively reserved for it by identifying that the reservation identifier flag embedded in the forward channel has been set to its identification value. However, this approach wastes channel bandwidth for very small messages, such as system acknowledgements and polling slots that are left empty for each reverse channel device that is polled but does respond because it does not have data packets to transmit. Such schemes do, however, typically allow for the use of low cost slower receive to transmit switching speed technology.

Contention based protocols are subject to instability because collisions may occur which in turn require increased attempts due to retransmission attempts. As traffic increases, utilization of the multiple access reverse channel typically drops due to increased numbers of collisions. The collision messages then are submitted for retransmission which causes the actual attempt rate (as opposed to the new arrival rate) to steadily increase without bound and once the optimal attempt rate has been passed the system utilization steadily falls. Eventually, all transmission slots may become filled with collisions and the system utilization will reach zero. This results in both a loss of revenue bearing traffic for the channel and typically dramatically increases the delay associated with delivery of data packets. This scenario is generally referred to as Aloha or reverse channel collapse.

To prevent Aloha instability, it is known to implement back-off procedures in contention based protocols. A subscriber device is only permitted to re-transmit each packet a finite number of times. Furthermore, each re-transmission is required to be delayed by an exponentially increased delay. This back-off policy does not eliminate the possibility that system instability can occur but the possibility is significantly reduced. Furthermore, if the channel utilization does fall because the attempt rate has exceeded the maximum that the system can support, then the back-off policy provides a mechanism for recovery if instability occurs.

Back-off rules typically involve two components. First, if a transmission attempt fails then the subscriber device will delay a subsequent transmission attempt by a random time interval. Second, if the number of transmission attempts exceeds a predetermined threshold then the subscriber device will discard the queued packet and abort the transmission attempt. The first rule minimizes the possibility that two or more subscriber devices will execute re-transmission attempts after an initial collision in an identical time slot. This approach provides an effective splitting algorithm that prevents continuous repeating collisions but it does not reduce the actual attempted traffic. The second rule provides a form of non-persistence which allows the system to recover. The rule effectively increases the departure rate, and departures are now partitioned between those that are successfully transmitted and those that are abandoned.

The above stabilization procedure is generally only viable in systems where the contribution to the attempted traffic from new arrivals is essentially steady, predictable and sufficiently low so that the total attempted traffic rate can remain at or below unity. The technique can control short term transient increases in the arrival rate, which are assumed to be infrequent, and the associated loss in channel utilization can be tolerated. However, if the number of new arrivals exceeds the departure rate (both successful and aborted) then the system may continue to drift to lower utilization. However, even though such a channel is incapable of supporting the entire traffic volume, utilization may fall to where the channel is unable to provide optimal utilization for even a portion of the traffic volume because of the limitations of these previously known stabilization techniques. This problem is a particular concern for radio or wireless packet data systems such as commercial, two-way, paging and message systems which include a mix of short and extended message traffic. To summarize, reverse channel Aloha collapse is undesirable because the revenue stream generated by the cell is significantly reduced, subscriber devices burn excess battery power through multiple fruitless transmission attempts and message center originated messages will suffer an inordinate acknowledgment time while subscribers will be prevented from initiating and successfully transmitting a data packet.

SUMMARY OF THE INVENTION

It is, therefore, an objective of the present invention to resolve the problem of providing efficient utilization of and system stability for a multiple access channel in a packet data system including contention based access procedures under conditions in which the new arrival rate for data packets to be transmitted exceeds the departure rate. The present invention provides a multiple access communication network with dynamic access control allowing channel utilization to be optimized even under conditions in which the arrival rate of data packets for transmission exceeds the system departure rate for such packages. The present invention further provides a means for identifying congested multiple access channels so that traffic may be routed to less heavily utilized channels.

A dynamic access control parameter is broadcast on a forward channel and received by all subscriber devices wishing to transmit on the associated reverse channel. The dynamic access control parameter regulates access to the reverse channel by defining a criteria which must be satisfied by a subscriber device before the subscriber device attempts to transmit a data packet on the reverse channel. The transmission parameter is generated based on the success rate and collision rate for the reverse channel. If the rate of successful data packet transmissions fails to meet a desired level and the collision rate exceeds a desired level, then the dynamic access control parameter is adjusted to increase the number of transmission attempts by subscriber devices which are prevented. If the success rate fails to meet the predetermined criteria and the collision rate is low, the dynamic access control parameter is adjusted to increase the percentage of transmission attempts by subscriber devices which are allowed. By providing a dynamically adjusted control parameter which selectively limits the rate of transmission attempts on the reverse channel, the utilization of the reverse channel (i.e., number of successful transmissions of data packets on the reverse channel) can be optimized under network conditions where the arrival rate of data packets would otherwise exceed the departure rate causing a decrease in reverse channel utilization and system instability.

In one embodiment of methods of the present invention, a dynamic access control method for a multiple access communication network having a forward channel and a reverse channel is provided. Transmitted packets are transmitted on the reverse channel to a forward channel transmission apparatus or base station. The base station determines if the received packets were received without error. A dynamic access control parameter is generated for regulating access to the reverse channel based on whether the received packets were received without error. A channel control packet (i.e. message) including the generated dynamic access control parameter is broadcast by the base station on the forward channel to control access to the reverse channel.

In another aspect of methods of the present invention, a transmission success rate and a transmission collision rate for the reverse channel of the communication network is determined. A change rate for the dynamic access control parameter is established if the determined success rate is below a predetermined acceptable level. A change direction for the dynamic access control parameter is established based on the collision rate. The dynamic access control parameter is then generated based on the established change rate and change direction. A subscriber device receives the broadcast channel control packet and reads the dynamic access control parameter in the received channel control packet. The subscriber device generates an access control limit value and submits a packet for transmission if the generated access control limit value satisfies the dynamic access control parameter. The access control limit value in one embodiment of the present invention is based on a random number function. The change rate is a function of the determined success rate and a target success rate and the change direction is a function of the determined collision rate and the target collision rate.

In a further aspect of methods of the present invention, the dynamic access control methods include back-off procedures. A packet transmission attempt count is incremented after a packet is submitted for transmission. The packet is transmitted if the attempt count is no greater than a maximum attempt count. A transmission delay time is also determined. The packet is transmitted after waiting the determined transmission delay time.

In another embodiment of methods of the present invention, a plurality of base stations are connected to a network management system and the base stations report their respective dynamic access control parameters to the network management system. Congested reverse channels are identified based on the dynamic access control parameters and routing of packets on the communication network is allocated to reduce demand on reverse channels identified as congested.

Also provided are forward channel transmission apparatus or base stations for use in a multiple access communication network having a forward channel and a multiple access reverse channel. The forward channel transmission apparatus includes receiving means for receiving transmitted packets on the reverse channel. The forward channel transmission apparatus also includes determining means for determining if the received packets were received without error. Generating means generate a dynamic access control parameter for regulating access to the reverse channel based on whether the received packets were received without error. Broadcasting means is provided for broadcasting a channel control packet including the generated dynamic access control parameter on the forward channel. The forward channel transmission apparatus generating means in one embodiment includes means for determining a transmission success rate and a transmission collision rate for the communication network and for establishing a change rate for the dynamic access control parameter if the success rate is below a predetermined acceptable value. Means for establishing a change direction for the dynamic access control parameter based on the collision rate and for generating the dynamic access control parameter based on the established change rate and change direction are also provided. In one aspect of forward channel transmission apparatus of the present invention, the change rate is a function of the transmission success rate and a target success rate and the change direction is a function of the transmission collision rate and a target collision rate.

In another aspect of forward channel transmission apparatus of the present invention, the communication network includes a plurality of multiple access reverse channels each of which has an associated dynamic access control parameter and the forward channel transmission apparatus includes means for comparing the dynamic access control parameters. Also provided are means for identifying congested ones of the plurality of reverse channels based on the dynamic access control parameters and for allocating routing of packets on the communication network to reduce demand on congested ones of the plurality of reverse channels.

Also provided are reverse channel transmission apparatus or subscriber devices for use in a multiple access communication network having a forward channel including a broadcast channel control packet. The broadcast channel control packet includes a dynamic access control parameter. The reverse channel transmission apparatus includes receiving means for receiving the broadcast channel control packet and reading means for reading the dynamic access control parameter in the received channel control packet. Also provided in the reverse channel transmission apparatus is generating means for generating an access control limit value and submitting means for submitting a packet for transmission if the access control limit value satisfies the dynamic access control parameter.

In another aspect of reverse channel transmission apparatus of the present invention, the apparatus includes means for incrementing a packet transmission attempt count. Also provided in the reverse channel transmission apparatus, are means for transmitting a packet if the attempt count is no greater than a maximum attempt count. Furthermore, means for determining a transmission delay time and means for transmitting a packet after waiting the determined transmission delay time are also provided. In another aspect of reverse channel transmission apparatus of the present invention, the access control limit value is based on a random number function.

The methods and apparatus of the present invention may be beneficially utilized in a variety of networks having a contention based multiple access channel. These networks may include wireless networks such as cellular networks or wire line networks. The methods and apparatus of the present invention may also be utilized in a wired network.

Accordingly, the dynamic access control methods and forward and reverse channel transmission apparatus of the present invention address the problem of providing a reliable, high-utilization, multiple-access communication channel whose utilization may be optimized even under conditions where the arrival rate of new data packets for transmission exceeds the departure rate. The present invention further provides such a system having the ability to reallocate traffic demand between channels to reduce demands on overloaded channels. The methods and apparatus of the present invention are provided by utilizing a broadcast dynamic access control parameter which regulates access to a multiple access reverse channel by establishing a criteria which must be met by subscriber devices before they are allowed to transmit data on the reverse channel. The dynamic access parameter is adjusted to optimize channel utilization based upon a determined success rate and collision rate for the multiple access channel of the communication network. The dynamic access control parameter value from a number of different forward channel transmission apparatus may be transmitted to a network management system which identifies congested reverse channels based on the respective dynamic access control parameters and allocates routing of packets on the communication network to reduce demand on congested channels.

DETAILED DESCRIPTION OF ILLUSTRATED EMBODIMENTS

The present invention now will be described more fully hereinafter with reference to accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
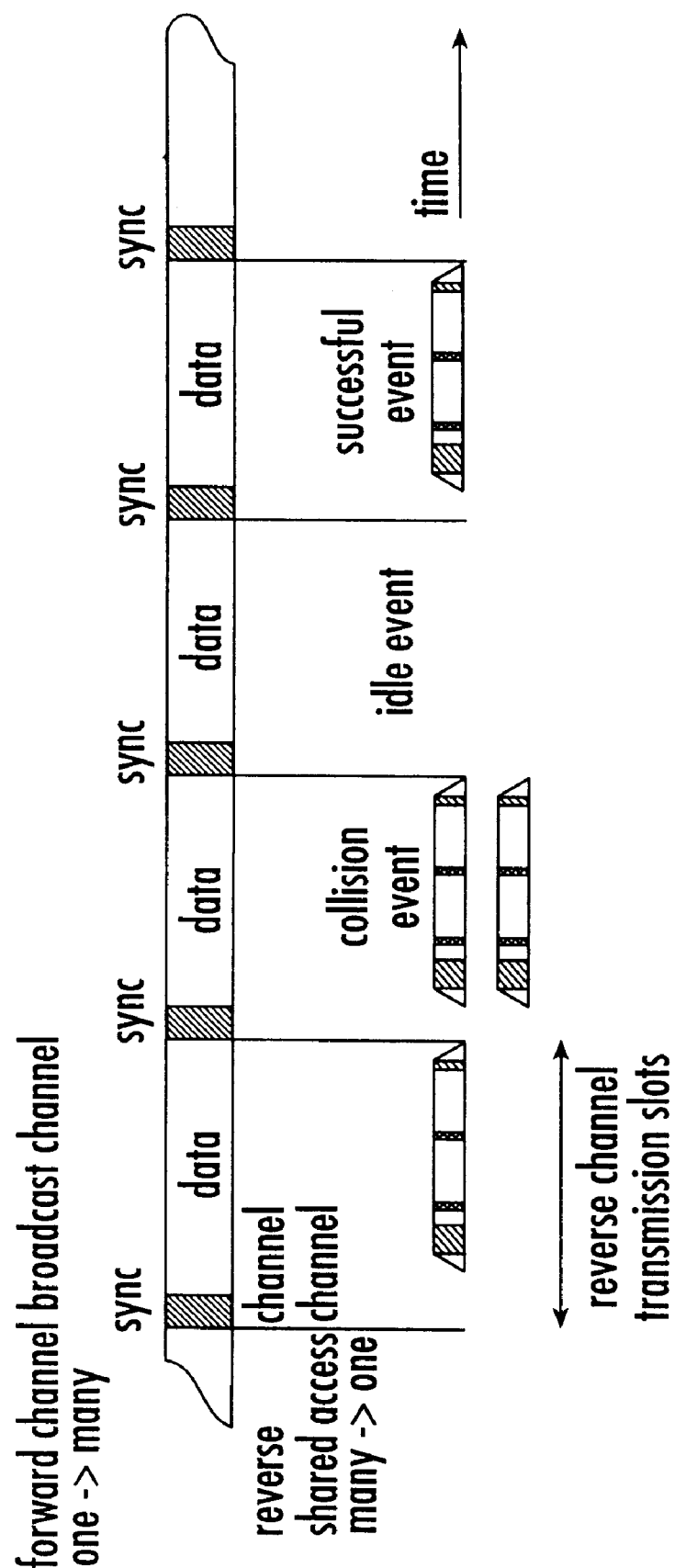
FIG. 1 schematically illustrates a slotted Aloha contention protocol.
Figure 2:
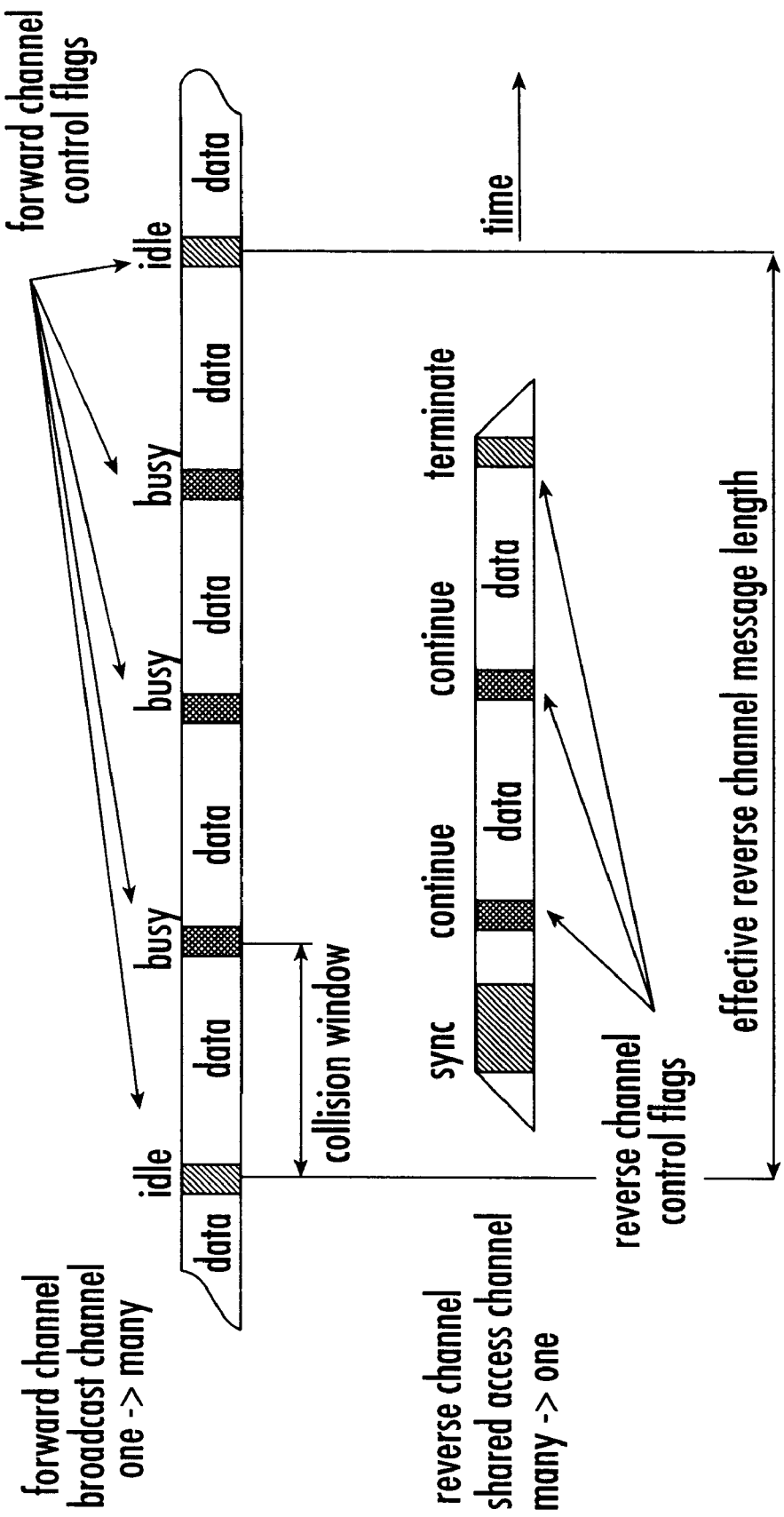
FIG. 2 schematically illustrates a carrier sense multiple access protocol.
Figure 3:
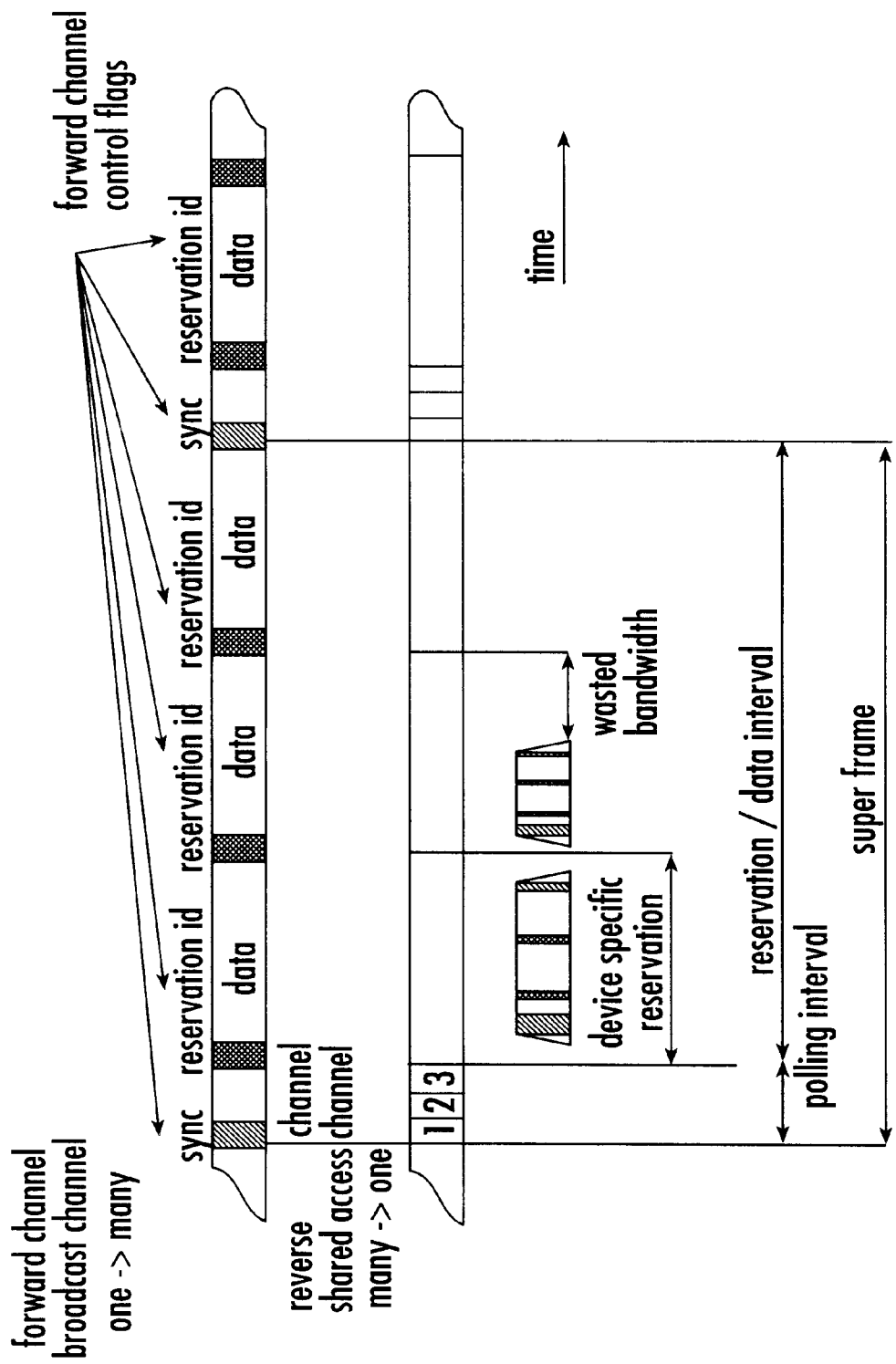
FIG. 3 schematically illustrates a packet reservation multiple access protocol.
Figure 4:
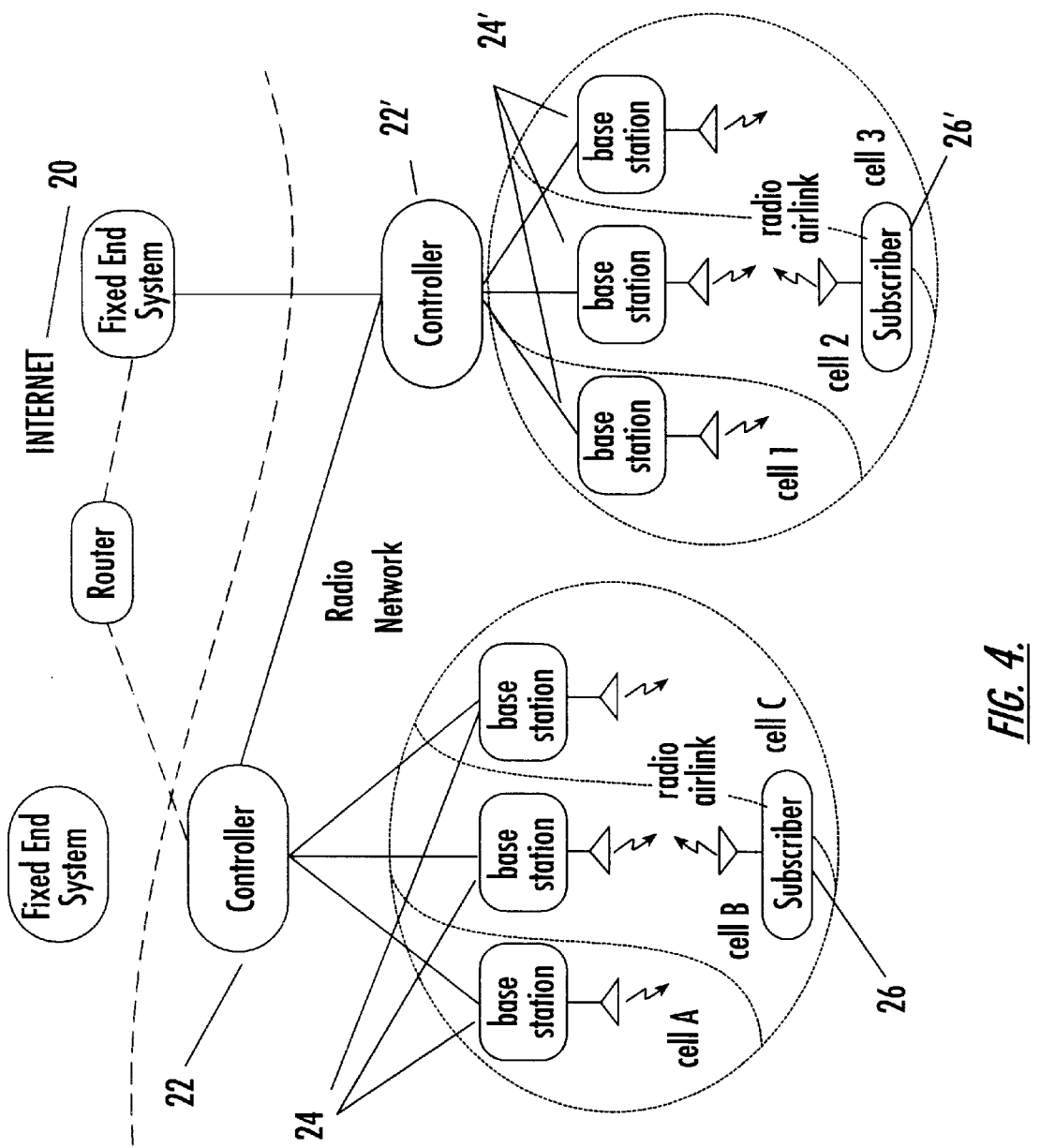
FIG. 4 schematically illustrates an operating environment of the methods and apparatus of the present invention.

Referring now to FIG. 4, an operating environment of the present invention is schematically illustrated. Shown in FIG. 4 are fixed end systems and a router device in a hardwired internet network 20. Hardwire network 20 is connected to radio network controllers 22, 22'. Each controller 22, 22' controls one or more base stations 24, 24'. As illustrated in FIG. 4, base stations 24, 24' are radio communication network base stations associated with cells of cellular networks indicated as cell A, cell B, cell C, cell 1, cell 2 and cell 3, respectively. Base stations 24, 24' are forward channel transmission apparatus which receive communications on one or more multiple access reverse channels. Each base station 24, 24' may support one or more reverse channels.

Base stations 24, 24' establish radio data packet communications with subscriber devices 26, 26'. Subscriber devices 26, 26' are reverse channel transmission apparatus which receive transmissions from base station 24, 24' on a forward or downlink channel and transmit to base stations 24, 24' on a multiple access reverse or uplink channel.

Controllers 22, 22' and base stations 24, 24' may, for example, comprise a paging and messaging system. Controllers 22, 22' interface the radio network to hardwire network 20 and provide mobility management by constructing and updating a directory or routing table to map an internet IP address of subscriber device 26, 26' to a specific temporary address and channel stream identifying a current connection for subscriber device 26, 26' through one of base stations 24, 24'. Communications between internet fixed end systems and subscriber devices 26, 26' may then be made transparent to the fixed end systems.

Overview of the Invention

Existing packet radio systems are designed to support specific applications which exhibit well defined data packet sizes and traffic profiles. Methods and apparatus of the present invention can support and adapt to a varying range of packet sizes and traffic profiles while achieving a high channel utilization. This is desirable in a public/commercial system which supports a multitude of different applications. Although it is generally difficult to predetermine the exact traffic profiles prior to commercial service, it is possible to identify prominent characteristics. In general, data transactions are either network 20 or subscriber device 26 originated. Network originated traffic primarily generates reverse channel traffic in the form of short system acknowledgments indicating the receipt of a data packet. In contrast, subscriber originated data transactions utilize the reverse channel to deliver messages of varying sizes. Exact packet sizes typically cannot be predetermined due to the unpredictable nature of each application that may utilize the system. In addition, as subscriber device 26 migrates throughout the radio network, very short location update/cell transfer messages are preferably transmitted in an efficient manner. Therefore, the reverse channel traffic is typically polarized between a single, fixed size acknowledgment message and data packet messages that are variable in size and have a somewhat larger minimum size.

The present invention provides a contention mode suited to short messages and ensures that both upper layer management, connection and application protocols can correctly execute by transmitting longer frames. The inclusion of a contention free reservation mode enables devices to transmit extended messages that are not limited to a single data packet. Furthermore, reservation mode allows the reverse channel utilization to arbitrarily approach 100% as the message length is extended.

The present invention consists of a forward channel data stream (broadcast by the base station) that is delineated into forward channel blocks (the data contained in each block is ordinarily protected against channel impairments and errors by an error detecting and correcting FEC code). The block boundaries are identified by the inclusion of a forward channel synchronization word within each block. Furthermore, embedded in each block is an Reservation/contention flag and a Reservation Identifier. The Reservation/contention flag is used to indicate to the population of subscriber devices that the reverse channel is available for contention access or whether it has been allocated to a specific device for a reservation transmission.

The reverse channel transmissions may be categorized as a contention burst, or as reservation block or multiple reservation block transmissions. The reverse channel transmissions are synchronized to the forward channel block intervals which may support a plurality of contention burst transmissions that are tightly synchronized to fall within slot boundaries, or a single reservation block transmission. The contention transmission bursts are designed to support acknowledgment messages to the forward channel traffic, reservation requests and all short system protocol exchanges. The reservation block length is designed to support a single data packet (minimum length) that may be transmitted by a subscriber originated data transaction.

To enable slow receive to transmit (and vice versa) switching times, the forward channel Reservation/contention and Reservation Identifier flags correspond to reverse channel traffic that will occur in a subsequent block(s). Preferably, a 2 block delay is provided to ensure that a low cost radio technology may be employed. However, depending upon system requirements the delay may be reduced to a single block interval or, conversely extended to provide further switching time. Subscriber device 26 secures a reservation transmission by first transmitting a reservation request embedded in a contention burst to base station 24. The reservation request specifies the exact number of reverse channel block intervals that are required to transmit an outstanding set of data packets which constitute a subscriber originated transaction. If base station 24 determines that the reservation may be granted, subscriber device 26 will observe that the forward channel Reservation/contention flag and Reservation Identifier are set to indicate that the reservation transmission may commence.

The present invention may be efficient because the reservation scheme allows an arbitrary unconstrained number of reverse channel block intervals to be potentially assigned to a specific subscriber device 26. The invention need not sacrifice bandwidth by requiring that a fixed predetermined number of block intervals cannot be fully utilized by the reservation request, as is common with existing reservation protocols. Moreover, the present invention may adapt to the specific traffic profile observed by base station 26. That is, if the traffic profile is biased towards contention traffic, the reverse channel is predominantly operated in the contention mode. Alternatively, if the reverse channel traffic reflects a significant volume of extended length messages, the reservation mode is more heavily utilized.

Figure 5:
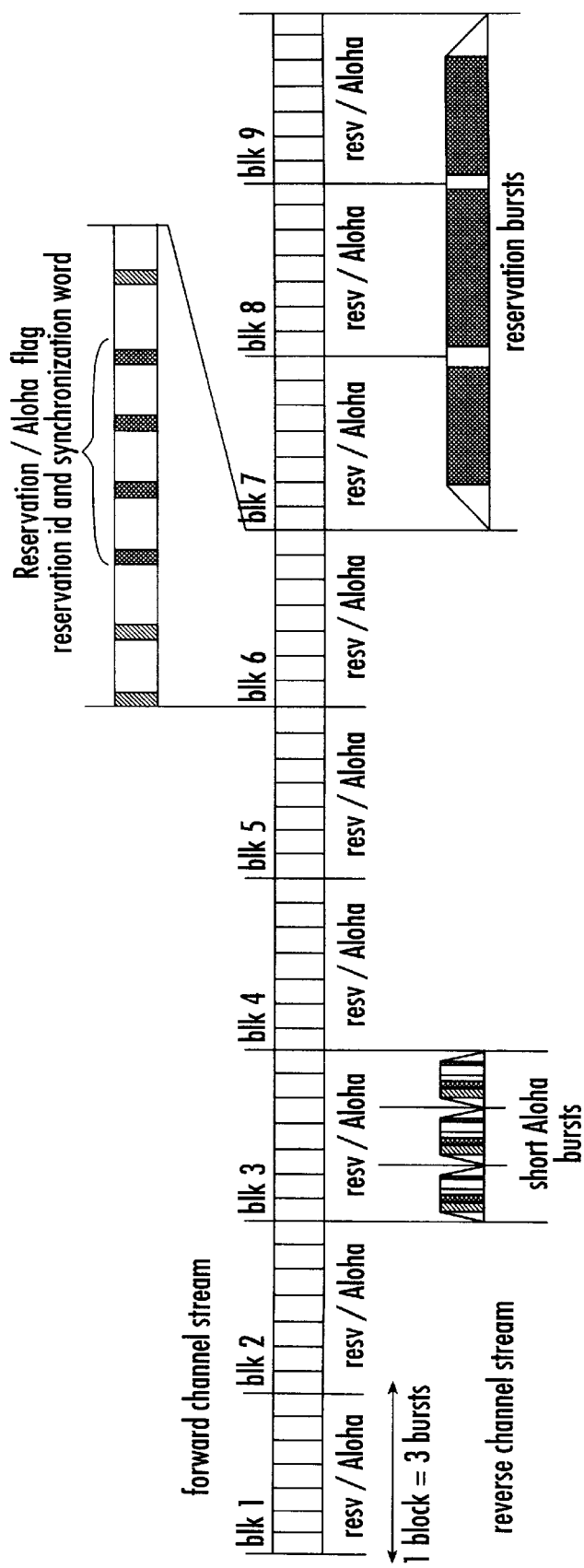
FIG. 5 schematically illustrates an embodiment of combined contention and reservation mode operations according to an embodiment of the present invention.

Referring now to FIG. 5, the framing of the forward and reverse channels according to an embodiment of the present invention is illustrated. As illustrated in FIG. 5, the forward channel stream is delineated into a series of transmission windows. Each transmission window includes a synchronization transmission, a Reservation/contention flag and a Reservation ID. For purposes of understanding the present invention, the description shall be based on an Aloha type contention mode and the terms "contention" and "Aloha" will be used interchangeably throughout the balance of this detailed description unless specifically noted. The Reservation (resv.) or Aloha state for a corresponding subsequent transmission window is indicated by bold. As illustrated in the embodiment of FIG. 5, the Reservation/Aloha flag in each block corresponds to a subsequent block, two blocks removed (i.e., block 1 corresponds to block 3 transmission on the reverse channel). The reverse channel transmissions illustrated in FIG. 5 include short Aloha bursts corresponding to block 3 and reservation bursts corresponding to blocks 7, 8 and 9. In the embodiment illustrated in FIG. 5, contention transmission windows are broken into 3 separate transmission slots.

Apparatus of the Present Invention

Figure 6:
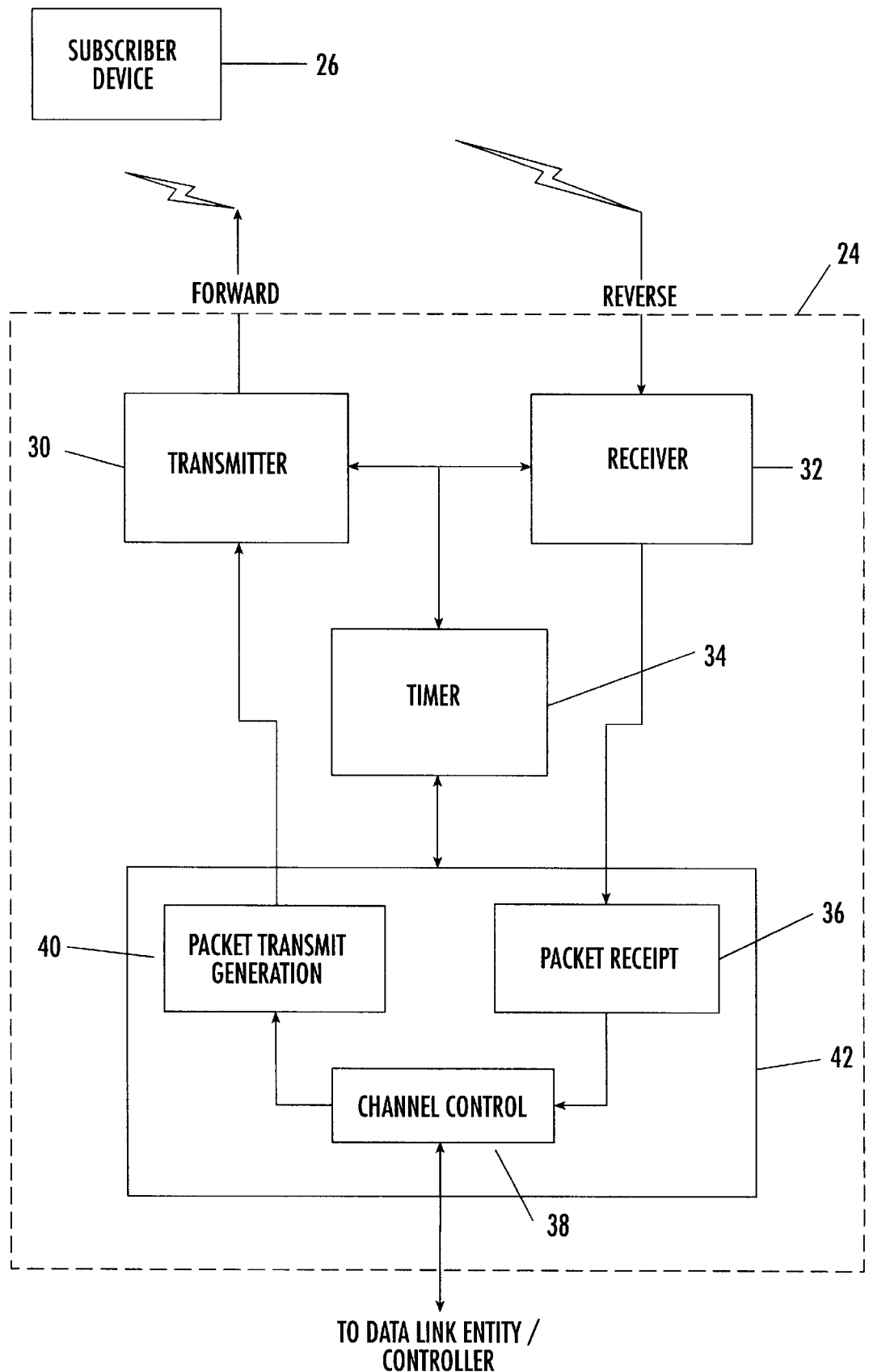
FIG. 6 is a schematic block diagram of a forward channel transmission apparatus according to the present invention.

Referring now to FIG. 6, an embodiment of a forward channel transmission apparatus or base station 24, according to the present invention, is illustrated. Base station 24 includes transmitter 30 or other broadcasting means for broadcasting a channel control packet on the forward channel. As illustrated in FIG. 5, base station 24 is a component of a radio data packet network including a forward channel having a wireless (radio) communication link in the forward and reverse channels. However, it is to be understood that the benefits of the present invention can also be obtained in a network including a wireline or wired network so long as base station or forward channel transmission apparatus 24 is operatively connected to the forward and reverse channels.

Receiver 32 or other receiving means for receiving a data packet and for receiving a reservation request on the reverse channel are also included in base station 24. Receiver 32 in the embodiment illustrated in FIG. 6 is also operatively connected to a wireless (radio) reverse channel. It is to be understood that while transmitter 30 and receiver 32 are illustrated as separate components capable of full duplex operation, the benefits of the present invention may also be obtained using a transceiver combining the operations of transmitter 30 and receiver 32. Timer 34 or other synchronizing means provides for synchronizing operations of transmitter 30 and receiver 32.

Base station 24 also includes packet receipt circuit 36 or other reading means responsive to receiver 32 for reading a reservation request to determine the identifier associated with the requesting subscriber device 26. Packet receipt circuit 36 also reads data packets received via receiver 32 from transmitting subscriber device 26. Channel control circuit 38 or other determining means responsive to packet receipt circuit 36, determines if reservation mode access to the reverse channel is available to requesting subscriber device 26 and determines if reservation mode or contention mode will be selected for the reverse channel in a subsequent transmission window. Packet transmit generation circuit 40 or other generating means responsive to channel control circuit 38 generates the channel control packet including setting the reservation or contention mode indication and the identifier associated with a selected subscriber device 26. As illustrated in FIG. 6, packet receipt circuit 36, channel control circuit 38 and packet transmit generation circuit 40 can be combined into base station control circuit 42. Base station control circuit 42 interfaces to a data link entity (not shown) which receives and transmits data packets through base station 24. Referring to FIG. 4, base station 24 may interface to a fixed end system associated data link entity through controller 22.

In one embodiment of a forward channel transmission apparatus of the present invention, as illustrated in FIG. 6, channel control circuit 38 further includes means for determining if a received data packet or reservation request has been successfully received. In this embodiment, packet transmit generation circuit 40 further includes generating means for generating a channel control packet which includes an acknowledgment of successfully received data packets or reservation requests. In another aspect of the present invention, channel control circuit 38 further includes means for queuing a plurality of received reservation requests.

As illustrated in FIG. 5, the forward channel is delineated into forward channel blocks. In this embodiment, packet transmit generation circuit 40, as illustrated in FIG. 6, includes means for broadcasting one of the channel control packets in each of the forward channel blocks. As the reverse channel transmissions are synchronized to correspond to the forward channel blocks, timer 34 synchronizes receiver 32 and transmitter 30 for reverse channel receipt timing. Furthermore, channel control circuit 38 and packet transmit generation circuit 40 broadcast channel control packets including an indication of reservation or contention mode and an identifier which are associated with a subsequent one of the forward channel blocks. Similarly, indications in the broadcast channel control packet of successfully received packets on the reverse channel are associated with a preceding one of the forward channel blocks.

As will be appreciated by those of skill in the art, the above described aspects of the present invention in FIG. 6 may be provided by hardware, software, or a combination of the above. While the various components of forward channel transmission apparatus or base station 24 have been illustrated in FIG. 6 as discrete elements, they may, in practice, be implemented by a microcontroller including input and output ports and running software code, by custom or hybrid chips, by discrete components or by a combination of the above. For example, packet receipt circuit 26, channel control circuit 38 and packet transmit generation circuit 40 could all be implemented as a single programmable device.

Figure 7:
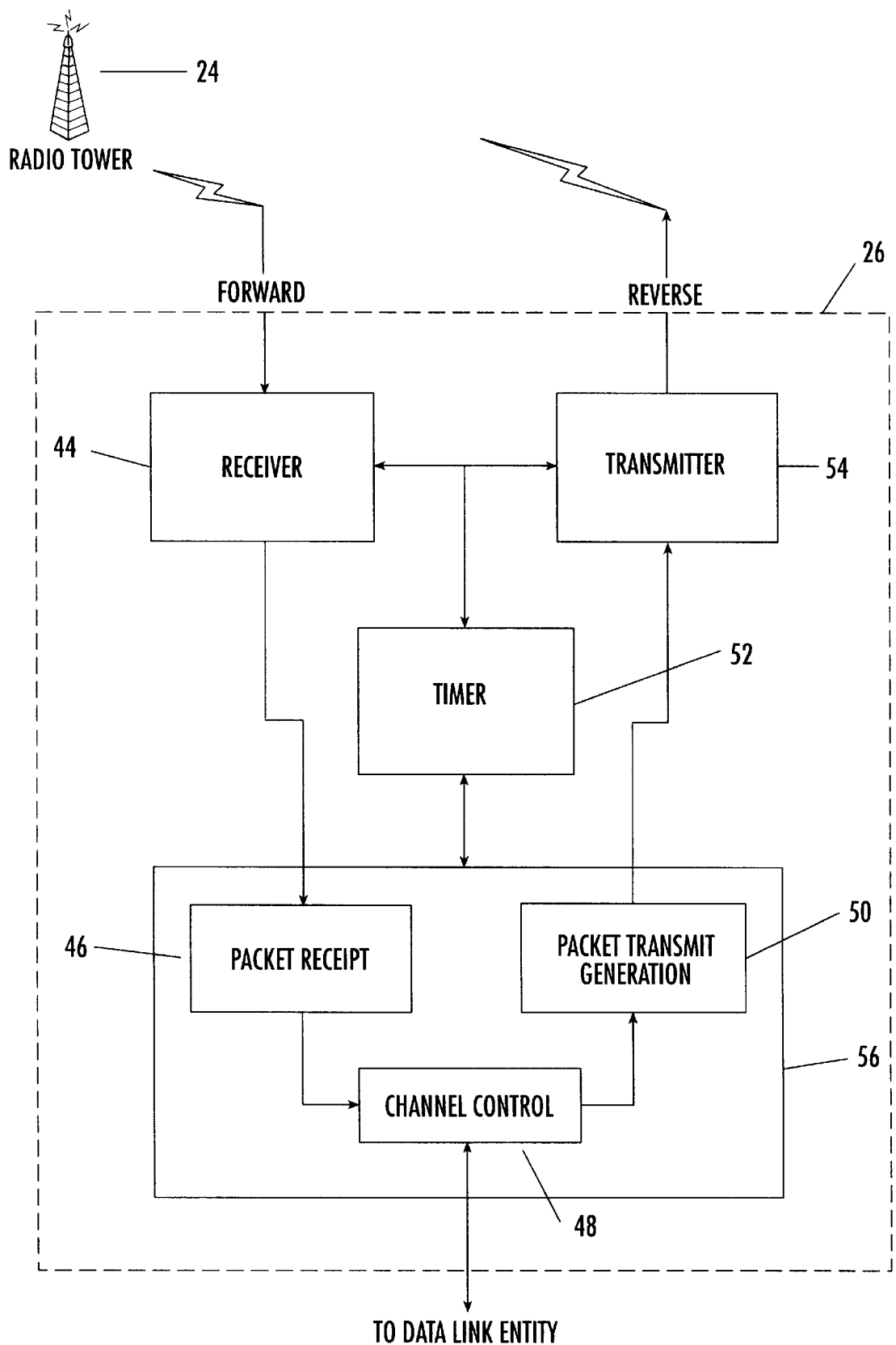
FIG. 7 is a schematic block diagram of a reverse channel transmission apparatus according to the present invention.

Referring now to FIG. 7, an embodiment of a reverse channel transmission apparatus or subscriber device 26 according to the present invention is illustrated. Subscriber device 26 includes receiver 44 or other receiving means for receiving a broadcast channel control packet. Receiver 44 also provides means for receiving data packets transmitted from base station 24. Subscriber device 26 further includes packet receipt circuit 46 or other reading means for reading received channel control packets to determine if a contention or a reservation mode is indicated and if an identifier associated with subscriber device 26 is included in the received channel control packet. In one embodiment of the reverse channel transmission apparatus of the present invention, packet receipt circuit 46 further includes means for reading an acknowledgment status flag in the channel control packet to determine if a previously transmitted data packet was received.

Subscriber device 26 also includes channel control circuit 48 or other determining means for determining if a data packet to be communicated exceeds a predetermined size. Packet transmit generation circuit 50 or other means responsive to packet receipt circuit 46 and channel control circuit 48 for transmitting a data packet on the reverse channel either if contention mode is indicated and the data packet is no larger than the predetermined size or if reservation mode is indicated and an identifier associated with the reverse channel transmission apparatus 26 is included in the received channel control packet is also provided. Packet transmit generation circuit 50 further provides means responsive to packet receipt circuit 46 and channel control circuit 48 for transmitting a reservation request on the reverse channel if contention mode is indicated and the size of the data packet to be transmitted exceeds the predetermined size.

Timer 52 or other synchronizing means is provided for synchronizing the operations of receiver 44 and transmitter 54. Transmitter 54 operates responsive to packet transmit generation 50 to provide means for transmitting data packets and reservation requests on the reverse channel. As illustrated in FIG. 7, packet receipt circuit 46, channel control circuit 48, and packet transmit generation circuit 50 may be combined in subscriber device control circuit 56.

In one embodiment of the reverse channel transmission apparatus of the present invention as illustrated in FIG. 5, the forward channel is delineated into forward channel blocks. Transmissions by transmitter 54 are synchronized to correspond to the forward channel blocks as detected from transmissions received by receiver 44 and packet receipt circuit 46. Transmission of data packets and reservation requests by transmitter 54 and packet transmit generation circuit 50 are provided in selected subsequent ones of the forward channel blocks which are associated with the received channel control packets. Subscriber device 26 through subscriber device control circuit 56 is operatively connected to a datalink entity (not shown) which is receiving and transmitting data packets over the radio communications network.

As will be appreciated by those of skill in the art, the above described aspects of the present invention in FIG. 7 may be provided by hardware, software, or a combination of the above. While the various components of reverse channel transmission apparatus or subscriber device 26 have been illustrated in FIG. 7 as discrete elements, they may, in practice, be implemented by a microcontroller including input and output ports and running software code, by custom or hybrid chips, by discrete components, or by a combination of the above. For example, packet receipt circuit 46, channel control circuit 48, and packet transmit generation circuit 50 could all be implemented as a single programmable device.

Overview of the Methods of the Present Invention

Figure 8:
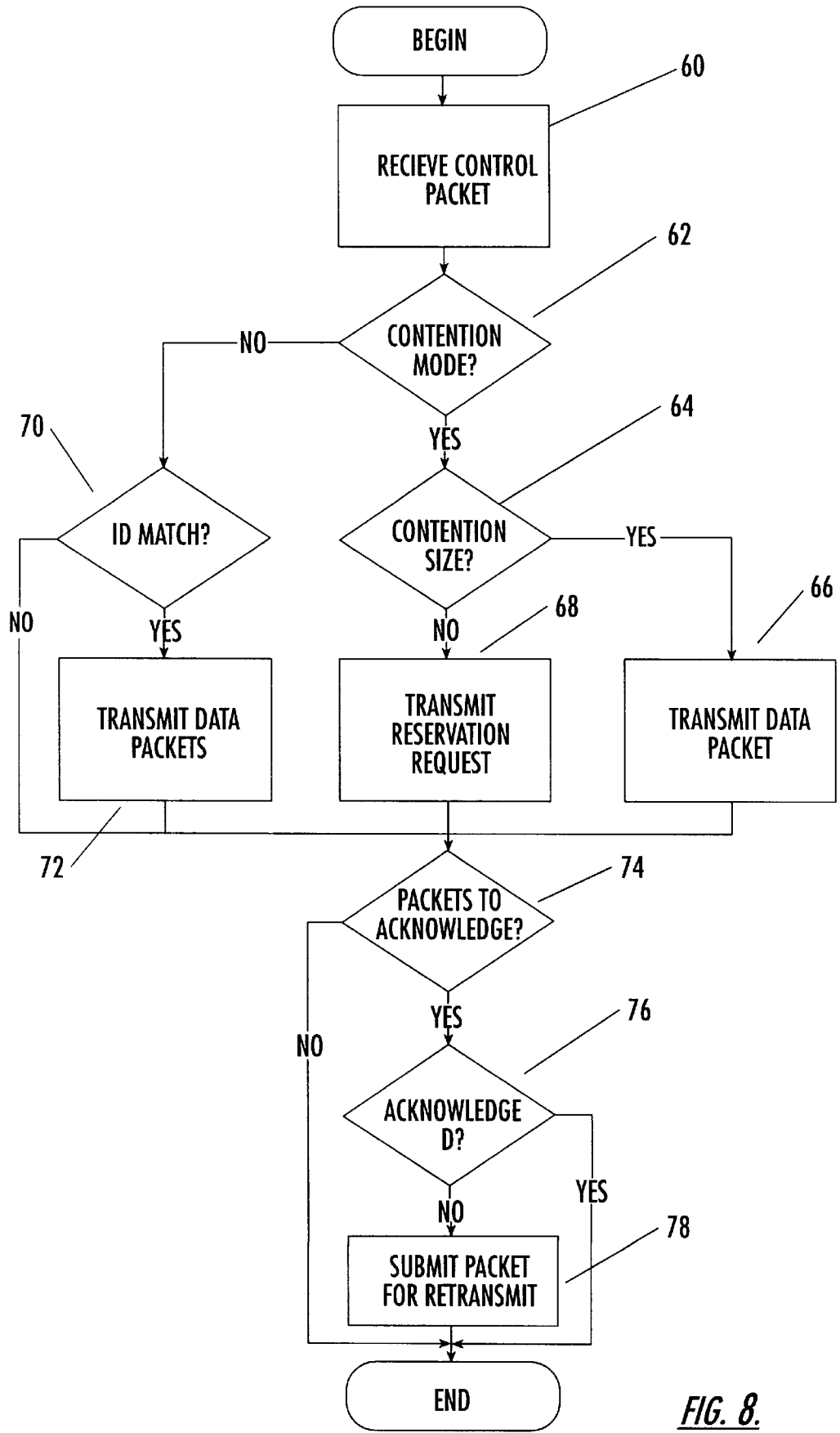
FIG. 8 is a flowchart illustrating operations of a reverse channel transmission apparatus according to a channel access method of the present invention.

Referring now to FIG. 8, an embodiment of operations for channel access for communicating a data packet over a multiple access communication network having a forward channel and a reverse channel according to the present invention will be described. More particularly, FIG. 8 illustrates operations of a method according to the present invention as executed by a reverse channel transmission apparatus 26. At block 60, one of the broadcast channel control packets is received and read by subscriber device 26 to determine if contention or reservation mode is indicated. If contention mode is indicated at block 62 and the data packet size to be transmitted is no larger than the predetermined size at block 64, the data packet is transmitted as a short burst in contention mode at block 66. If it is determined that contention mode is indicated at block 62 and determined at block 64 that the data packet to be communicated exceeds a predetermined size, at block 68 a reservation request is transmitted on the reverse channel. If reservation mode is indicated at block 62 and if the control packet read at block 60 includes an identifier associated with the receiving subscriber device 26 at block 70, the data packet or packets are transmitted in reservation mode at block 72.

In one embodiment of methods of the present invention, the control packet received at block 60 further includes an acknowledgment indication (status flag) for previously transmitted data packets or reservation requests. The received acknowledgment status flag corresponds to a preceding one of the channel transmission windows. At block 74, subscriber device 26 determines if it has any outstanding data packets or reservation requests requiring acknowledgment. If so, at block 76, subscriber device 26 determines from the acknowledgment status flag or flags of the received channel control packet if the previous transmission was received. At block 78, if the previous transmission is not acknowledged, it is submitted for retransmission.

Figure 9:
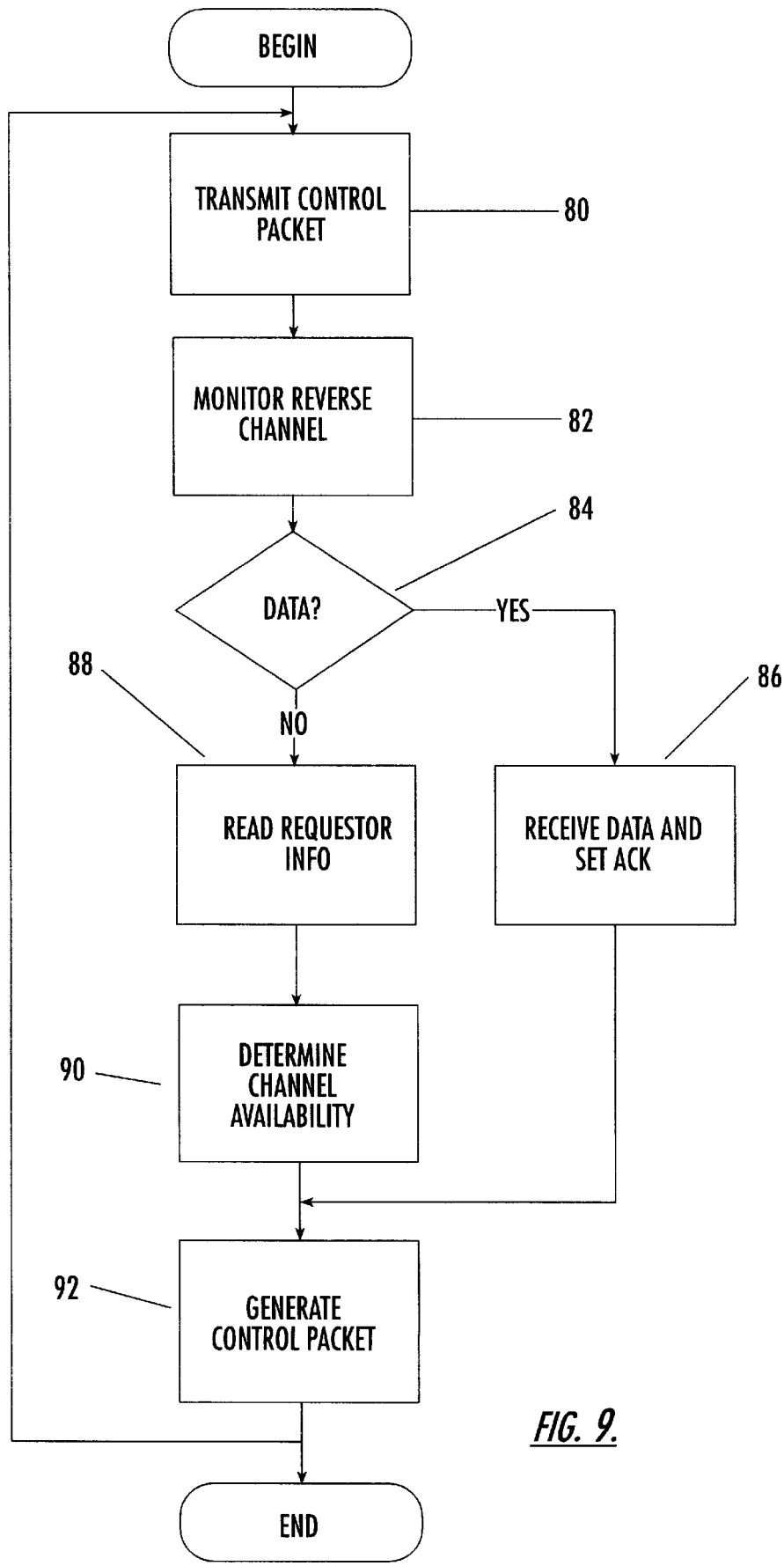
FIG. 9 is a flowchart illustrating operations of a forward channel transmission apparatus according to a channel access method of the present invention.

Referring now to FIG. 9, operations of an embodiment of the channel access methods of the present invention will be further described as executed by a forward channel transmission apparatus or base station 26. At block 80, a channel control packet is broadcast on the forward channel. At block 82, base station 24 monitors the reverse channel for transmissions from subscriber devices 26. Base station 24 may receive a transmitted reservation request or a data packet on the reverse channel at block 82. A collision may also be detected at block 82. If it is determined at block 84 that a data packet rather than a reservation request has been received, the data packet is received and read at block 86.

If it is determined at block 84 that a reservation request has been received at block 82, the reservation request is read at block 88 to determine the identifier associated with the subscriber device 26 transmitting the reservation request. At block 90, base station 24 determines if reservation mode access to the reverse channel is available to the subscriber device 26 transmitting the reservation request. At block 92, a channel control packet is generated for transmission responsive to the received reverse channel transmission. If it is determined at block 90 that reservation mode access is available to the requesting subscriber device 26, the generated channel control packet which will be subsequently transmitted at block 80, as indicated by the looping path reflecting periodic transmission of channel control packets, is generated to indicate reservation mode and to include an access device identifier associated with the device transmitting the reservation request.

In one embodiment of methods of the present invention, the forward channel is delineated into forward channel blocks and the operations of FIG. 9 are repeated for each forward channel block. In another embodiment of methods of the present invention, reservation requests from subscriber device 26 further include an indication of the size of the data packet to be transmitted. Reservation mode access to any one requesting subscriber device 26 is made available by base station 24 for no more than a predetermined maximum number of forward channel block transmission windows on the reverse channel for any single reservation request. This embodiment allows base station 24 to control the amount of reservation mode access allocated to any individual subscriber device 26. In another embodiment, reservation mode access operations at block 90 include queuing a plurality of received transmitted reservation requests for reservation mode access to the reverse channel.

In an additional aspect of methods of the present invention, as illustrated in FIG. 9, base station 24 provides acknowledgment of received data packets. At block 86, when a data packet is successfully received, an acknowledgment status flag is set which is included at block 92 when the channel control packet for transmission is generated. The acknowledgment status flag in the generated channel control packet is associated with a specific previously transmitted data packet and indicates successful receipt of the data packet.

As is illustrated in the embodiment of FIG. 5, and more specifically with respect to illustrated blk 3, the reverse channel blocks may be broken into a plurality of contention mode transmission windows. Subscriber device 26 at block 66 and at block 68 of FIG. 8 selects one of the predetermined number of contention mode transmission windows corresponding to portions of the forward channel block designated for contention mode transmission and transmits the data packet or reservation request, respectively, in the selected one of the plurality of transmission windows.

Figure 10:
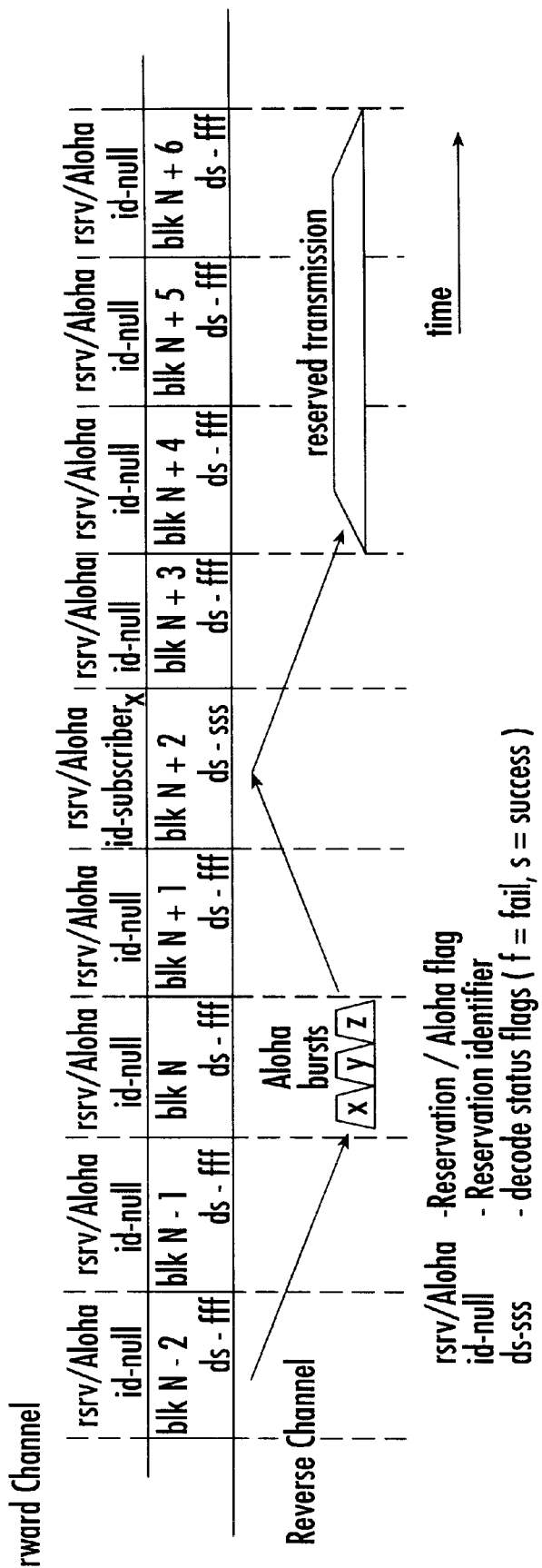
FIG. 10 schematically illustrates operations of an embodiment of the channel access methods and apparatus of the present invention.

Detailed Description of Operations of the Channel Access Methods and Apparatus of the Present Invention Referring now to FIG. 10, channel access procedures according to an embodiment of methods and apparatus of the present invention will now be described. As illustrated in FIG. 10 at blk N–2, subscriber device 26 examines the Reservation/contention (rsvr/Aloha) flag to determine its state, which is indicated in bold as Aloha in FIG. 10. Accordingly, subscriber device 26 transmits a short data packet or reservation request in a randomly selected one of the three Aloha burst slots indicated as x, y, and z in blk N. Otherwise, subscriber device 26 waits to transmit its request for a subsequent forward channel block. By sending the reservation/contention flag two block intervals early, subscriber device 26 is allowed a minimum of a one full block interval to switch from receive to transmit. It is preferable that subscriber device 26 selects one of the three Aloha burst transmission windows at random to minimize the risk of a collision with another transmitting subscriber device 26.

If the data packet to be transmitted is too long for inclusion in a single contention transmission window, a reservation request is sent indicating the amount of reverse channel bandwidth required to be allocated to subscriber device 26 to transmit the outstanding data packet(s). If base station 24 accepts the reservation request and determines reservation mode access is available, subscriber device 26 is notified via the forward channel two block intervals later as indicated in FIG. 10 at blk N+2. Subscriber device 26 then determines that the reservation request has been successful by observing that the reservation/contention flag has been set to reservation and that the reservation identifier (id-subscriber in blk N+2) reflects the associated identifier of the requesting subscriber device 26. This, once again, provides the minimum one block interval switching time from transmit to receive for subscriber device 26. The reservation flag is not set to reservation by the forward channel transmission apparatus 24 until blk N+2 (even though base station 24 may, as a full duplex device have received it, and been in a position to set the reservation flag in blk N+1) so that sufficient time is allowed for switching from transmit to receive by subscriber device 26. The data packet is then transmitted by subscriber device 26 beginning at blk N+4 and continuing with the required number of additional blocks which, as illustrated in FIG. 10, include blk N+5 and blk N+6 for the reservation mode transmission from subscriber device 26.

Figure 11:
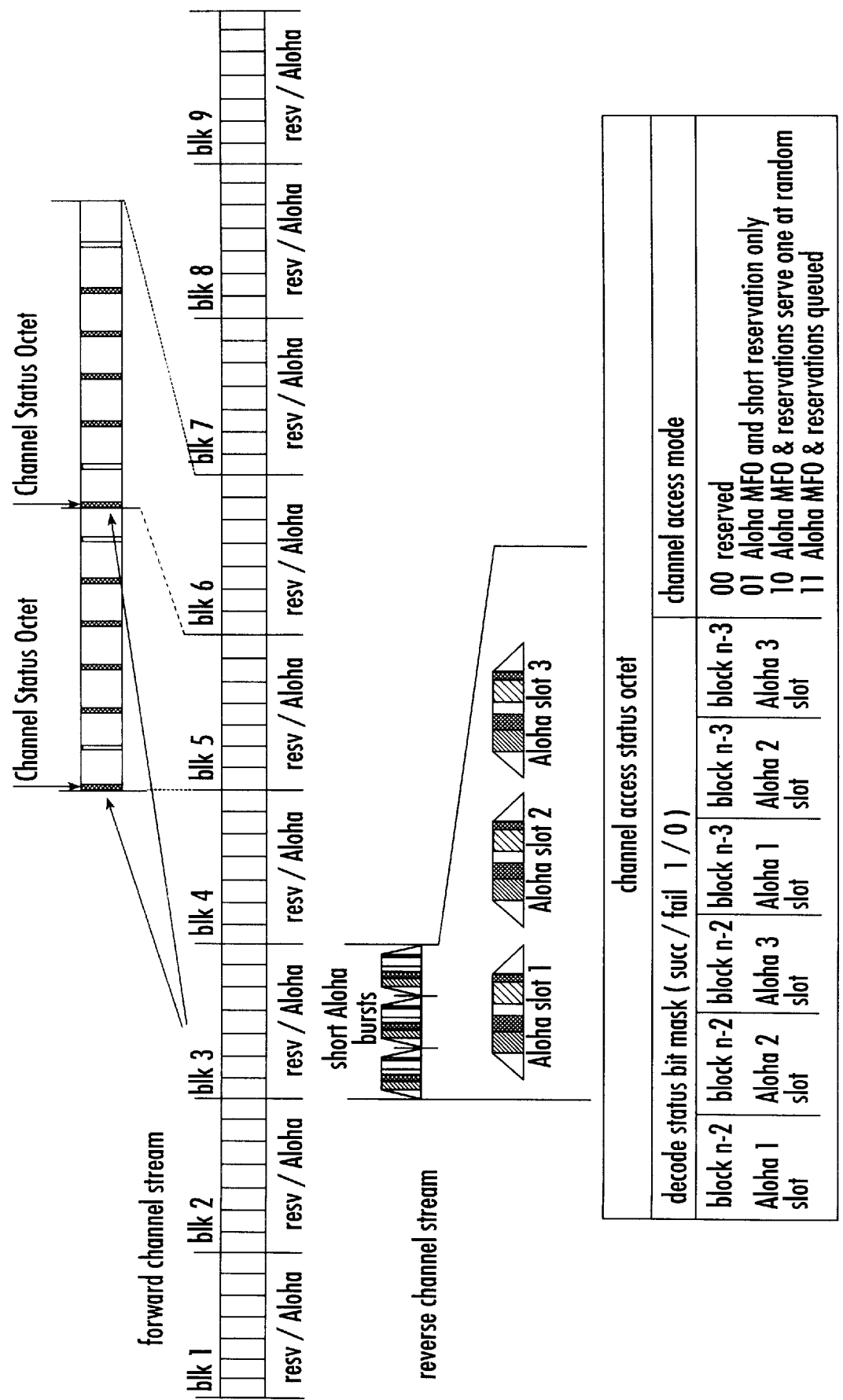
FIG. 11 schematically illustrates an embodiment of a channel access method and apparatus of the present invention including a decode status bit mask for acknowledgment of successfully transmitted packets and a dynamic access control parameter.

As illustrated further in the embodiment shown in FIG. 11, methods and apparatus of the present invention further provide a low layer decode status mechanism to initiate correction of failed transmissions prior to the invocation of higher layer recovery mechanisms to thereby reduce channel utilization for transmission of repeat request packets which are typically required by higher layer recovery mechanisms. Lost data packets may then be retransmitted and successfully received before higher layer recovery mechanisms initiate retransmission requests with the associated overhead and channel utilization thereof.

As illustrated in FIG. 11, a channel access status octet is embedded within each channel control packet transmitted in each forward channel block. Typically, each of these transmissions is further protected by a forward channel error correcting strategy which strategies are known and understood by those of ordinary skill in the art and will not be discussed further herein. As illustrated in FIG. 11, the channel access status octet is partitioned with a six bit decode status bit mask and a two bit channel access mode field. The first three bits of the decode status bit mask indicate the success or failure of the Aloha transmissions received on the reverse channel that correspond to the forward channel block interval transmitted two blocks prior to the current forward channel block interval. The second three bits indicate the success or failure of the Aloha transmissions received on the reverse channel that correspond to the forward channel block interval that was transmitted at three block intervals prior to the current block interval.

The second three bits of the decode status bit field represent status information that is being retransmitted for the second time. This repetition allows a subscriber device 26 that is, for example, experiencing a ten percent forward channel error rate to achieve a one percent indeterminate rate in the decode status information. Accordingly, on receipt of a decode status failure or two indeterminate decode status bit mask blocks, subscriber device 26 attempts to submit for retransmission the data packet or reservation request. If an Aloha burst is not received or the base station services a reservation request and receives reservation blocks, then the base station will set the Decode Status bits to failure.

A typical scenario is illustrated in FIG. 11. The following procedure may be used to determine the setting of the Decode Status bits in the Channel Access Status word. For the purposes of this procedure, base station 24 maintains a counter that increments as each forward channel block is encoded and transmitted. Base station 24 sets the Decode Status bits in the Channel Access Status word that is encoded and transmitted in the $N^{th}$ forward channel Reed Solomon block according to the following rules:

IF an Aloha burst was received in slot 1 on the reverse channel and correctly decoded while the (N−2)nd block was transmitted on the forward channel THEN Base station 24 sets $b_{11}$ of the Channel Access Status word to indicate success (1)

IF an Aloha burst was received in slot 2 on the reverse channel and correctly decoded while the (N−2)nd block was transmitted on the forward channel THEN Base station 24 sets $b_{10}$ of the Channel Access Status word to success (1)

IF an Aloha burst was received in slot 3 on the reverse channel and correctly decoded while the (N−2)nd block was transmitted on the forward channel THEN Base station 24 sets $b_9$ of the Channel Access Status word to indicate success (1)

IF an Aloha burst was received in slot 1 on the reverse channel and correctly decoded while the (N−3)rd block was transmitted on the forward channel THEN Base station 24 sets $b_8$ of the Channel Access Status word to indicate success (1)

IF an Aloha burst was received in slot 2 on the reverse channel and correctly decoded while the (N−3)rd block was transmitted on the forward channel THEN Base station 24 sets $b_7$ of the Channel Access Status word to indicate success (1)

IF an Aloha burst was received in slot 3 on the reverse channel and correctly decoded while the (N−3)rd block was transmitted on the forward channel THEN Base station 24 set $b_6$ of the Channel Access Status word to indicate success (1)

IF a reservation block was received on the reverse channel while the (N−2)nd block was transmitted on the forward channel THEN Base station 24 sets by $b_{11}$ $b_{10}$ and $b_9$ of the Channel Access Status word to indicate failure (0)

IF a reservation block was received on the reverse channel while the (N−3)rd block was transmitted on the forward channel THEN Base station 24 sets $b_8$ $b_7$ and $b_6$ of the Channel Access Status word to indicate failure (0)

IF Base station 24 determines that specific reservation requests received on the reverse channel while the (N−2)nd block was transmitted on the forward channel shall be discarded THEN Base station 24 sets $b_{11}$ and/or $b_{10}$ and/or $b_9$ of the Channel Access Status word to indicate failure (0)

IF Base station 24 determines that specific reservation requests received on the reverse channel while the (N−3)rd block was transmitted on the forward channel shall be discarded THEN Base station 24 sets $b_8$ and/or $b_7$ and/or $b_6$ of the Channel Access Status word to indicate failure (0)

ELSE Base station 24 sets the decode status bits of the Channel Access Status word to indicate failure (0)

As illustrated in FIG. 11, the channel access mode or reservation/contention flag is provided as a two bit channel access field. This embodiment provides four operation modes to allow base station 24 to adaptively set modes to reflect actual traffic flow on the network. These modes, as illustrated in FIG. 11, include mode 1 (01), a contention mode with short reservation mode access only allowed (i.e., for example, limited to one to two blocks of reservations transmission per request). This mode may be desirable when the traffic profile for a particular channel is heavily biased toward short numeric and alpha paging on the forward channel. A second mode, mode 2 (10) is contention and reservation mode without queuing, but allowing longer reservation mode blocks. This mode is typically preferred when the traffic profile for a particular cell is biased towards forward channel messaging. Allowing only one reservation request at a time to be accepted provides twelve contention burst occurrences between every reservation transmission in the embodiment as illustrated in FIG. 9 where three Aloha bursts are allowed in each forward channel block. A final mode, mode 3 (11) is contention mode combined with queued reservations. This mode is preferably utilized when the traffic profile for a particular cell is biased towards extended reverse channel messaging. It is preferred that the actual traffic profile for a network be considered for each reverse channel stream and the specific operating mode selected be determined so as to optimize the reverse channel utilization.

Figure 12:
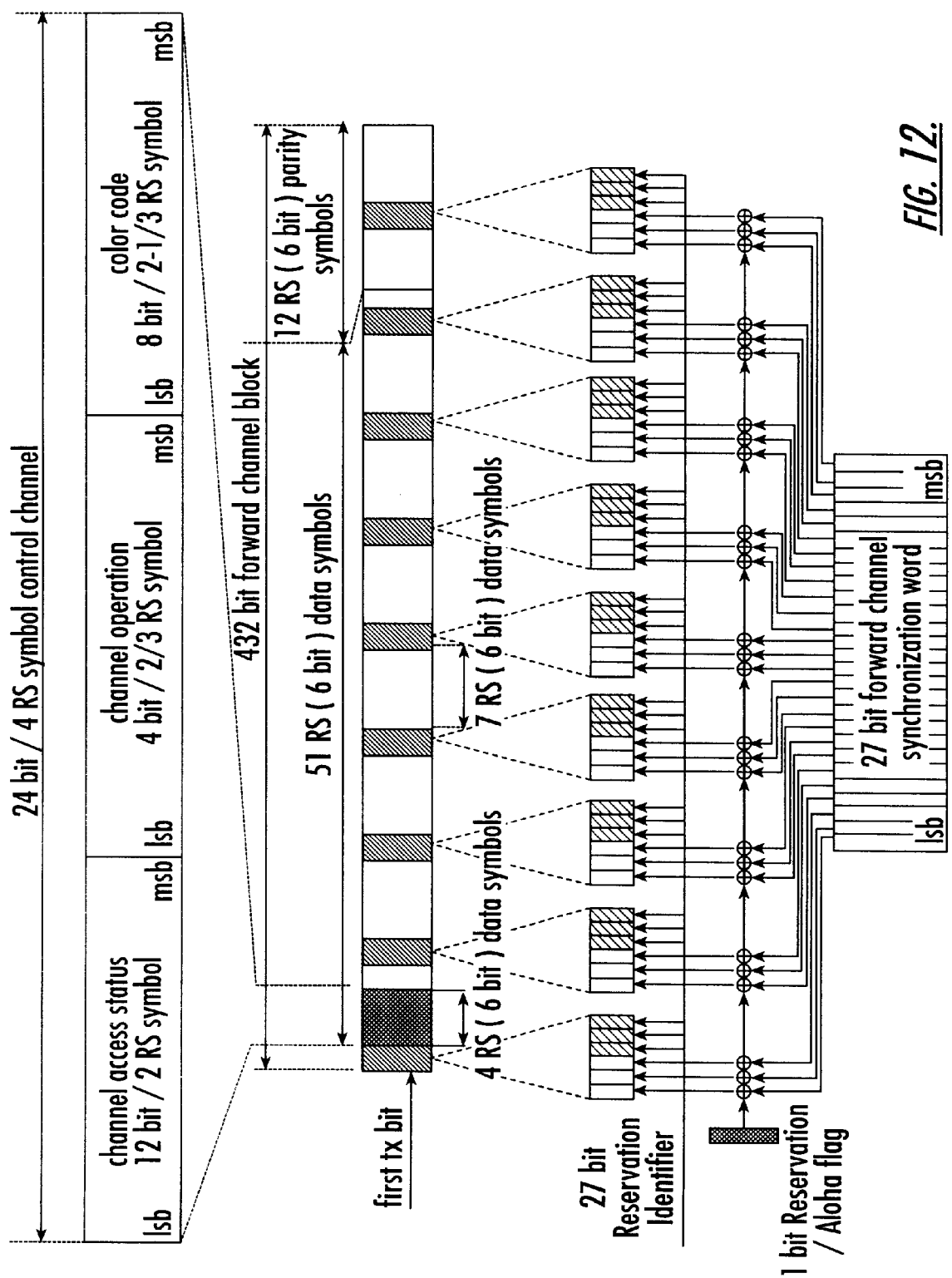
FIG. 12 schematically illustrates an embodiment of a forward channel structure according to the present invention.

Referring now to FIG. 12, the forward channel structure for an embodiment of methods and apparatus of the present invention will be described. It is to be understood that the particular encoding and bit breakdown of the illustrated forward channel structure is merely illustrative.

As illustrated in FIG. 12, the forward channel includes a sequence of 432 bit transmission blocks. Each block contains a 27 bit synchronization sequence and a 27 bit reservation identifier which are interleaved with a 378 Reed Solomon forward error correcting code. The 1 bit Reservation/Aloha flag is "exclusive-or" ed with the 27 bit forward channel synchronization word.

The forward channel Reed Solomon block consists of parity symbols and data symbols. The Reed Solomon code is a (63,51) code which is partitioned between 12 RS parity symbols and 51 RS data symbols. The data field is partitioned between the data field that is utilized for system messages and the channel access status word, channel operation word and color code.

The channel access status word is a 12 bit/2 Reed Solomon symbol word that contains the decode status bits, channel mode bits and the probability of transmission parameter. The channel operation word is a 4 bit/2/3 Reed Solomon symbol word that contains the channel capacity flag and additional system specific parameters. The color code may be employed in a radio environment to distinguish different transmission channels.

Figure 13:
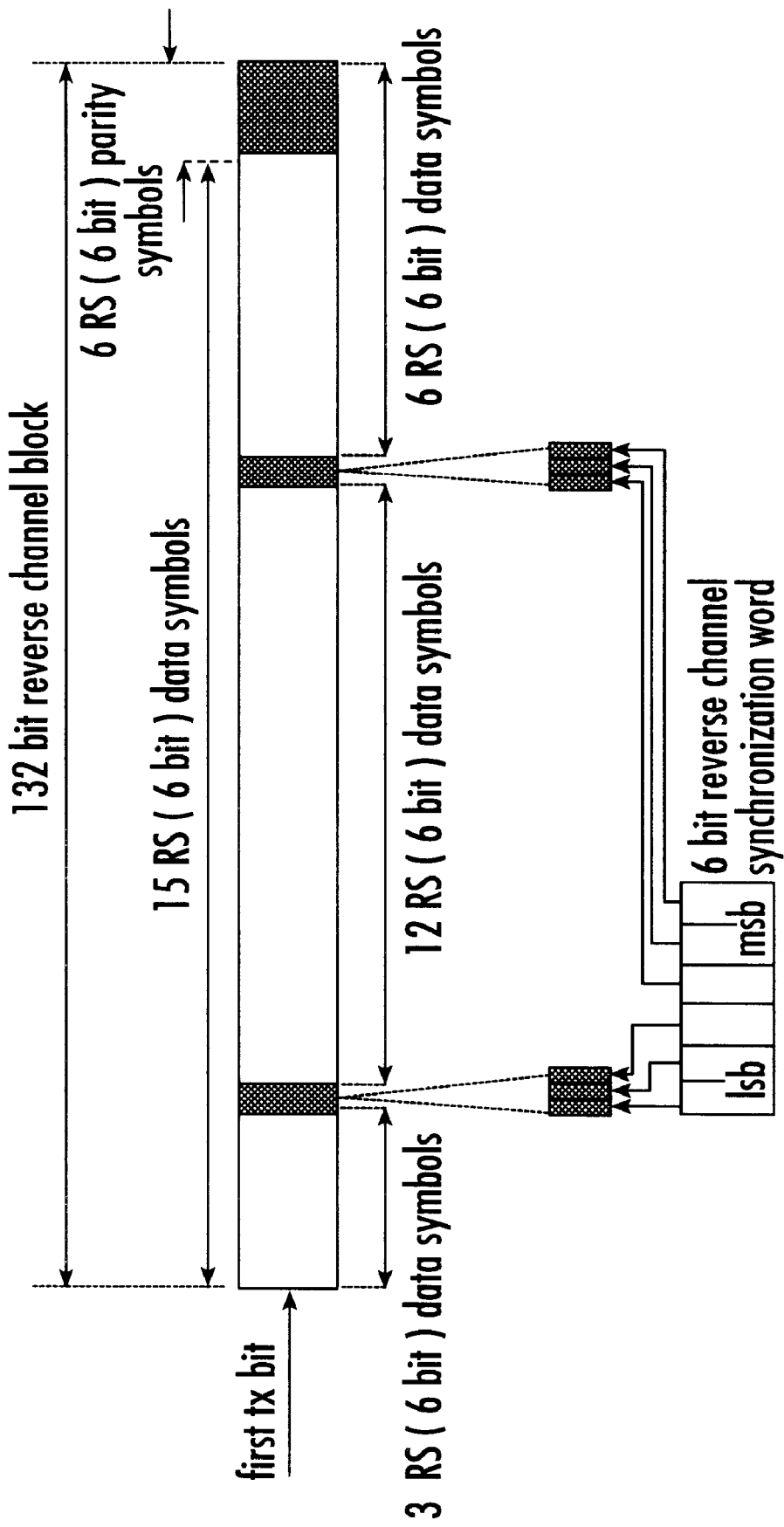
FIG. 13 schematically illustrates an embodiment of a reverse channel structure in contention mode according to the present invention.

As illustrated in FIG. 13, the reverse channel Aloha transmission burst includes a 132 bit transmission burst. Each Aloha burst contains a 6 bit synchronization sequence that is split into two 3-bit words that are interleaved with a 126 shorted Reed Solomon forward error correcting code. The Reed Solomon code is a (63,57) code which is partitioned between 6 RS parity symbols, 15 RS data symbols and 42 all Zero RS data symbols which are not transmitted. The Aloha transmission burst may contain a Reservation request or a short data message. A non-uniform distribution of the synchronization words throughout the Aloha transmission burst is provided. Additional synchronization words are placed at the beginning of the burst to assist in rapid acquisition of a transmission from subscriber device 26 by base station 24.

Figure 14:
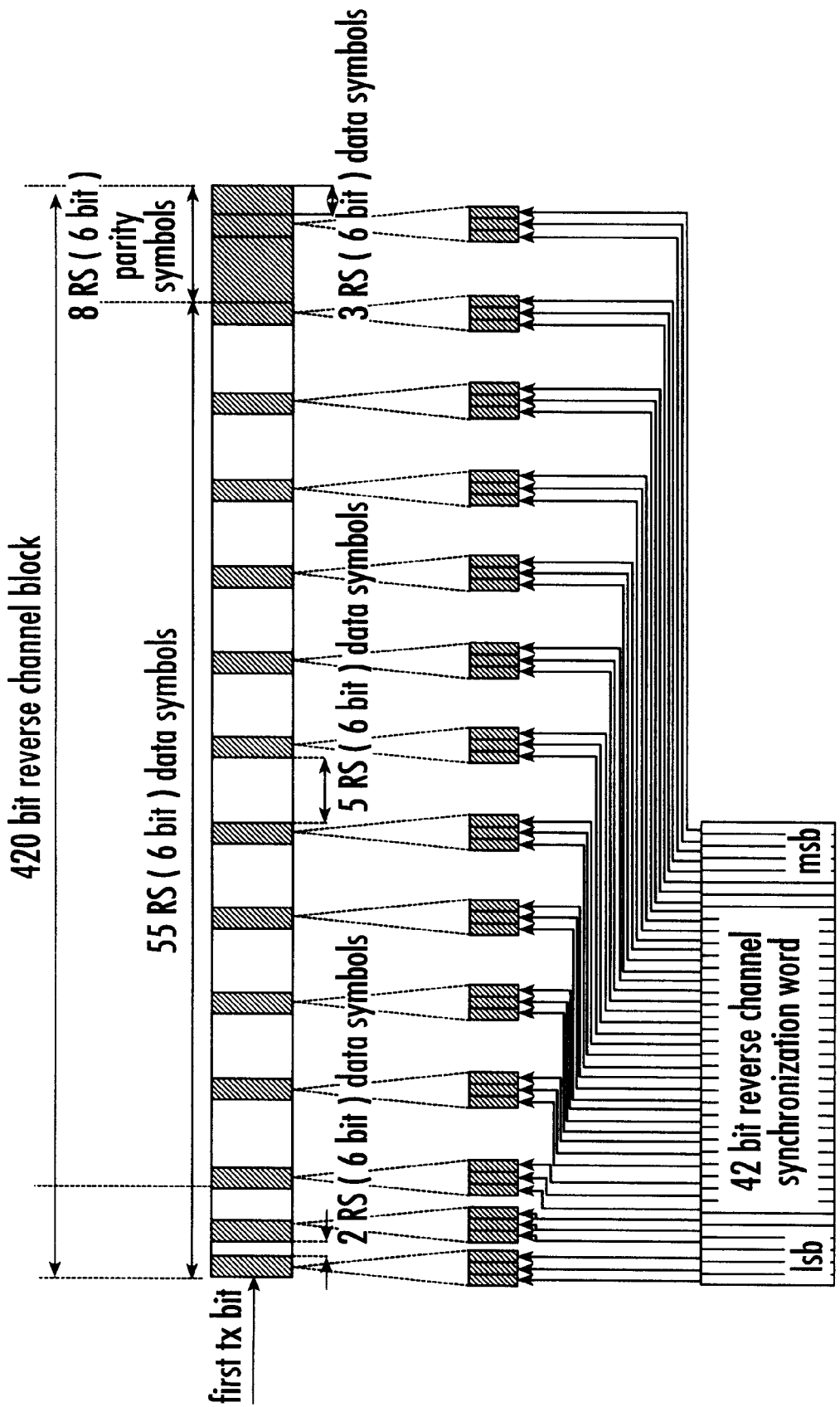
FIG. 14 schematically illustrates an embodiment of the reverse channel structure in reservation mode according to the present invention.

As illustrated in FIG. 14, the reverse channel Reservation transmission block includes a 420 bit transmission block. Each Reservation transmission block contains a 42 bit synchronization sequence that is split into fourteen 3-bit words that are interleaved with a 378 Reed Solomon forward error correcting code. The Reed Solomon code is a (63,55) code which is partitioned between 8 RS parity symbols, 55 RS data symbols. A non-uniform distribution of the synchronization words throughout the Reservation transmission block is provided. Additional synchronization words are placed at the beginning of the burst to assist in rapid acquisition of a transmission from subscriber device 26 by base station 24.

If subscriber device 26 has outstanding data packets for transmission, it is initially required to achieve synchronization with the forward channel and determine the reverse channel state from the Reservation/Aloha flag and the channel access status word that is encoded within each forward channel FEC block. If the reverse channel is available for Aloha access, subscriber device 26 may proceed to attempt access to the reverse channel.

Figure 15:
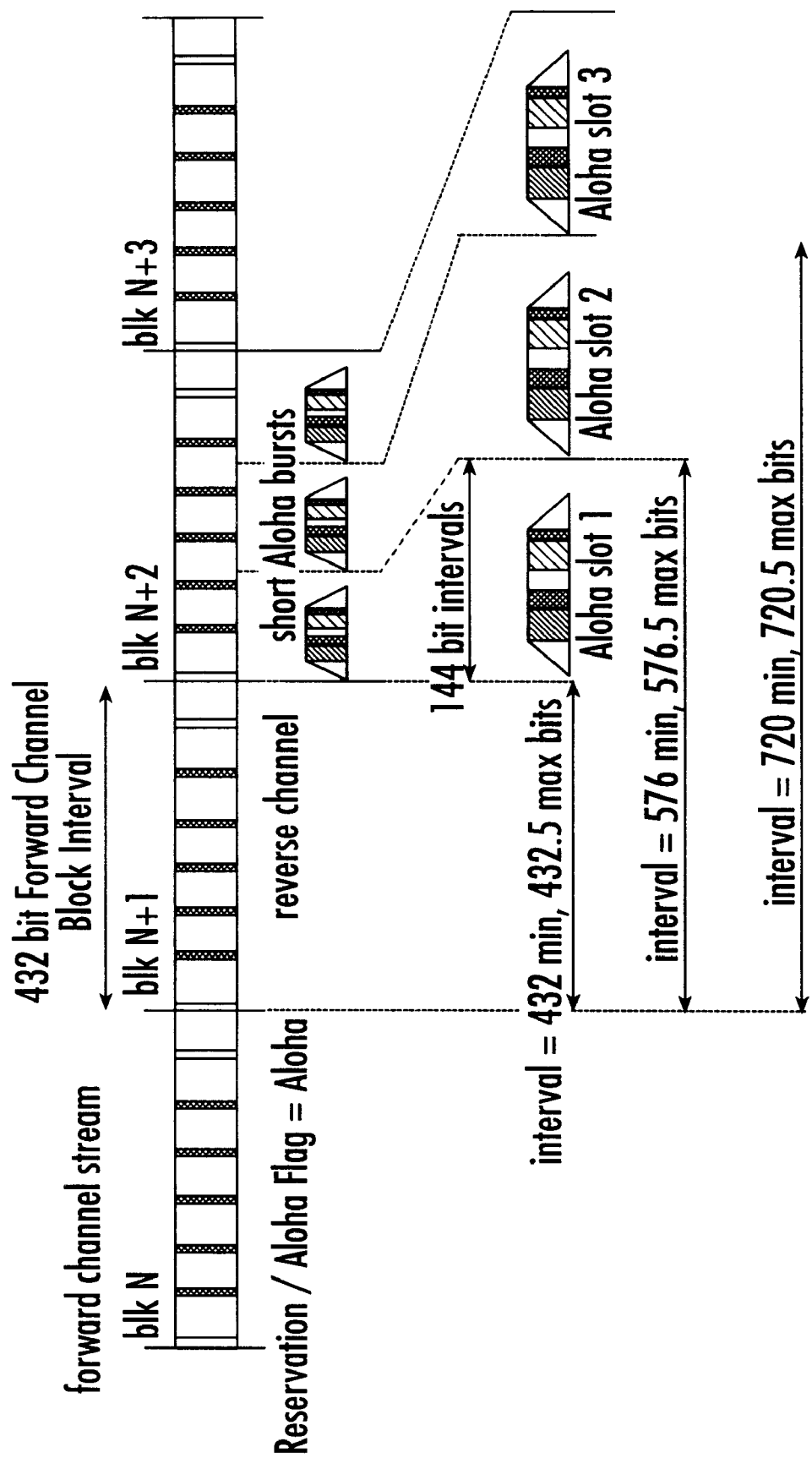
FIG. 15 schematically illustrates contention mode timing requirements according to an embodiment of the present invention.

Subscriber device 26 will initially assess whether the outstanding data packets may be compressed into a single Aloha transmission burst. Alternatively, subscriber device 26 will encode the data packets into a sequence of Reservation blocks and construct an Aloha reservation request burst indicating the number of reverse channel block intervals that are required for the reservation transmission. The burst is transmitted in one of the three available Aloha slots. As illustrated in FIG. 15, to enable half duplex subscriber devices 26 that employ a receive to transmit (and vice versa) switch time that is commensurate with a forward channel block duration, transmissions are delayed by two forward channel block intervals. Although an extended time period is allocated for the device to switch from receive to transmit, the actual transmission instant is preferably relatively tightly specified. This ensures that reverse channel bandwidth is efficiently utilized by allowing guard time, power ramp and synchronization overhead to be minimized.

Subscriber device 26 determines whether an Aloha transmission burst is successful by observing the decode status bits in the channel access status word that is embedded in the forward channel Reed Solomon block transmitted two forward channel block durations after the Aloha transmission occurred. If the forward channel Reed Solomon block is corrupted due to poor channel conditions, the decode status bits are also replicated by base station 24 in the subsequent channel access status word that is transmitted in the next forward channel Reed Solomon block. If subscriber device 26 determines that the transmission was successful, subscriber device 26 may terminate the channel access procedures. Alternatively, if the transmission attempt was a failure due to the decode status bit indicating failure or was declared indeterminate due to decoding failures, subscriber device 26 will initiate a re-transmission attempt.

Depending upon the operating mode that is utilized by base station 24, subscriber device 26 may or may not be able to immediately determine the success of the reservation request. When Mode 1 or 2 (see FIG. 11) are employed, a single reservation request is serviced and additional requests for bandwidth are not queued. Therefore, the success of an Aloha reservation request may be immediately determined by examining the Reservation Identifier and Reservation /Aloha flag transmitted two forward channel block intervals after the Aloha reservation request was transmitted. However, in Mode 3 (see FIG. 11), reservations are queued. Thus subscriber device 26 is required to examine the decode status bits and, if success is indicated, delay a re-transmission attempt of the Aloha reservation request until it is confirmed that the reservation queue is empty. If the reservation is granted, subscriber device 26 will initiate transmission of the previously encoded Reed Solomon blocks. In a similar manner to an Aloha transmission, subscriber device 26 is required to delay transmission by two forward channel block durations.

Subscriber device 26 timing requirements for the transmission of an Aloha burst are also illustrated in FIG. 15. A significant period of time is allocated to enable an extended receive to transmit switching time, receiver and DSP filter propagation delays, and demod/modulator processing delays. However, despite the extended processing period, the tolerance of the transmission instant as illustrated in the embodiment of FIG. 15 is defined to an accuracy of ±0.25 bit times. This provides 1.5 bit intervals (187.5 $\mu$s) to be allocated to free space propagation delay.

Figure 16:
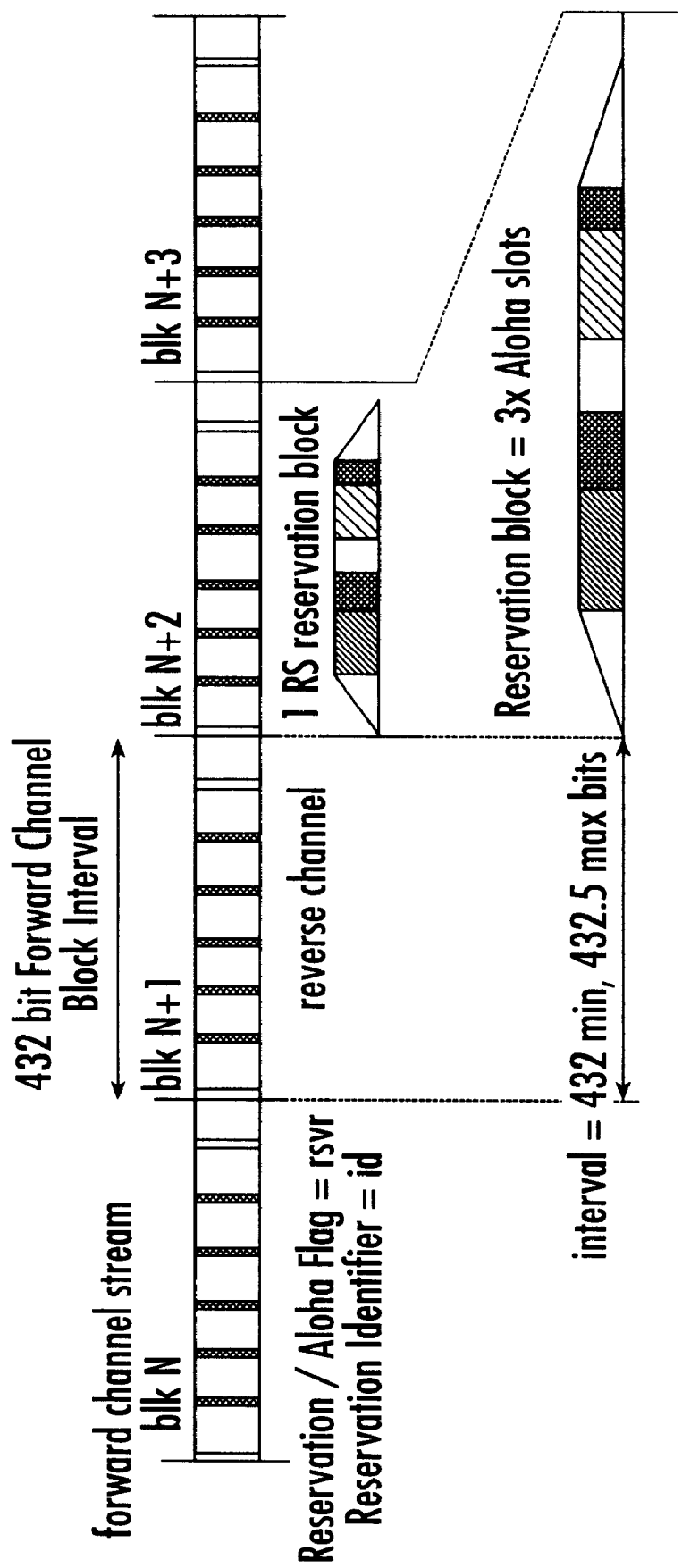
FIG. 16 schematically illustrates reservation mode access timing requirements according to an embodiment of the present invention.

Subscriber device 26 timing requirements for the transmission of a 428 bit Reed Solomon reservation block are illustrated in FIG. 16. A significant period of time is allocated to enable an extended receive to transmit switching time, receiver and DSP filter propagation delays, and demod/modulator processing delays. However, despite the extended processing period, the tolerance of the transmission instant as illustrated in the embodiment of FIG. 16 is defined to an accuracy of ±0.25 bit times. This provides 1.5 bit intervals (187.5 $\mu$s) to be allocated to free space propagation delay.

Figure 17:
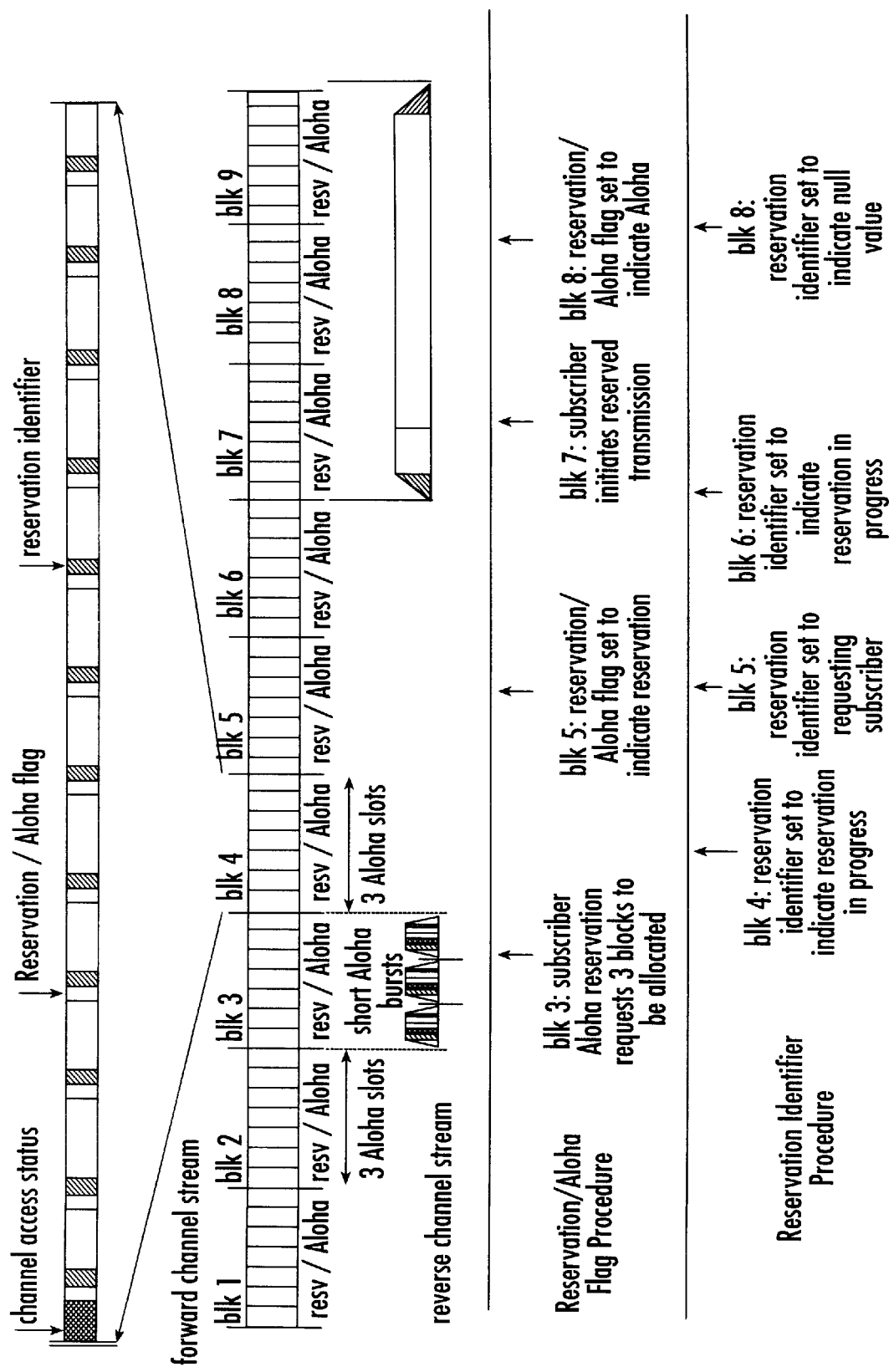
FIG. 17 schematically illustrates reservation/contention flag and reservation identification procedures according to an embodiment of the present invention.

Referring now to FIG. 17, details of procedures for the use of the Reservation/Aloha flag and Reservation Identifier of the channel control packet for an embodiment of the present invention will be further described. The Reservation/Aloha flag and Reservation Identifier are transmitted once in each forward channel block. The position of the 27 bit Reservation Identifier and 27 bit Reservation/Aloha flag are illustrated in FIG. 17. The Reservation/Aloha flag as illustrated is "exclusive or" ed with the 27 bit forward channel synchronization word.

The purpose of the Reservation/Aloha flag is to inform the population of subscriber devices 26 that are currently registered or using the channel that the reverse channel is available for slotted Aloha access on a contention basis, or that the reverse channel has been reserved for a specific subscriber device 26. To provide subscriber devices 26 with at least one forward channel block interval receive to transmit switch time, the Reservation/Aloha flag is set two forward channel blocks in advance of the actual associated reverse channel transmission window.

The Reservation Identifier is primarily utilized to identify a Specific subscriber device 26 for which the reverse channel has been allocated from a small subset of subscriber devices 26 for which reservation requests may be queued. In a similar manner to the Reservation /Aloha flag, the Reservation Identifier is set two blocks in advance of the anticipated subscriber transmission. However, as illustrated in the embodiment of FIG. 17, the reservation Identifier is also set by base station 24 to indicate that the reservation is in progress in the first block subsequent to receipt of a reservation request. When the system is operating in Mode 2 (Aloha and Serve One at Random) this is utilized in conjunction with the Reservation/Aloha flag by the population of subscriber devices 26 to determine if the transmission of a reservation request should be temporarily delayed. This measure conserves subscriber device power consumption and channel capacity.

An additional feature of the procedures governing the Reservation Identifier is also illustrated in FIG. 17. In the first and subsequent forward channel blocks after a subscriber specific Reservation Identifier has been transmitted, base station 24 sets the Reservation Identifier to the reservation in progress value. This prevents the subscriber device 26 for which the channel has been reserved from transmitting exactly one or more blocks later than required if the first Reservation Identifier is missed. This is desirable because base station 24 has reserved a specific number of reverse channel blocks for that subscriber device. Asynchronous transmission could potentially cause a collision with subsequent Aloha or queued reservation transmissions. The procedure also affords an additional advantage because the Reservation Identifier, in combination with the Reservation/Aloha flag, may be employed by the subscriber device 26 population to construct an effective 48 bit Reservation/Aloha flag that is extremely robust and tolerant to an errored channel. This approach significantly minimizes the number of occurrences in which a subscriber device 26 initiates an Aloha transmission while a reservation session is currently in progress.

Base station 24 may operate in a variety of modes as illustrated in FIG. 11. In general, the procedures for the Reservation/Aloha Flag are independent of which operating mode is utilized by base station 24. Ordinarily, the Reservation/Aloha flag is set to reservation two forward channel block intervals prior to the reverse channel transmission by subscriber device 26. Furthermore, the Reservation/Aloha flag is reset two blocks prior to the termination of the reverse channel transmission by subscriber device 26. The flag may be reset to indicate Aloha or Reservation depending upon which operating mode is utilized by base station 24. For the purposes of these procedures, base station 24 maintains a counter that increments as each forward channel block is encoded and transmitted. A typical scenario is illustrated in FIG. 17. Base station 24 sets the Reservation/Aloha flag that is encoded and transmitted in the Nth forward channel block according to the following rules:

IF a reservation request was received on the reverse channel and granted while the (N−2)nd block was transmitted on the forward channel
THEN Base station 24 sets the Reservation/Aloha Flag to indicate Reservation
IF Base station 24 determines that a reserved transmission by a subscriber device 16 will terminate during the (N+1)$^{st}$ forward channel block interval
THEN Base station 24 examines the reservation queue
IF Base station 24 determines that one or more reservation requests are still outstanding
THEN Base station 24 resets the Reservation/Aloha flag to reserved
ELSE Base station 24 resets the Reservation/Aloha flag to Aloha
IF Base station 24 determines that a reserved reverse channel transmission by a subscriber device 26 was absent during the N−1 forward channel block interval
THEN Base station 24 examines the reservation queue IF Base station 24 determines that one or more reservation requests are still outstanding THEN Base station 24 resets the Reservation/Aloha flag to reserved ELSE Base station 24 resets the Reservation/Aloha flag to Aloha In general, the procedures for the Reservation Identifier are also independent of which operating mode is utilized by base station 24. Ordinarily, the Reservation Identifier is set to identify a specific device two forward channel block intervals prior to the reverse channel transmission by the identified specific subscriber device 26. Furthermore, the Reservation Identifier flag is reset two blocks prior to the termination of the reverse channel transmission by the identified subscriber device 26. The identifier may be reset to indicate the identification of the next subscriber device 26 for which the reverse channel has been allocated or reset to the null identifier depending upon which operating mode is utilized by base station 24.

For the purposes of these procedures, base station 24 maintains a counter that increments as each forward channel block is encoded and transmitted. A typical scenario is illustrated in FIG. 17. Base station 24 sets the Reservation Identifier that is encoded and transmitted in the $N^{th}$ forward channel block according to the following rules:

IF A reservation request was received on the reverse channel and granted while the (N−2)nd block was transmitted on the forward channel THEN Base station 24 sets the Reservation Identifier to the reservation identifier of the specific subscriber device 26 for which the reverse channel will be allocated.

IF Base station 24 determines that a reserved transmission by subscriber device 26 will terminate during the $(N+1)^{st}$ forward channel block interval THEN Base station 24 examines the reservation queue IF Base station 24 determines that one or more reservation requests are still outstanding THEN Base station 24 resets the Reservation Identifier to the reservation identifier of the next subscriber for which the reverse channel will be allocated ELSE Base station 24 resets the Reservation Identifier to the null value IF A reservation request was received on the reverse channel and granted while the $(N-1)^{st}$ block was transmitted on the forward channel THEN Base station 24 sets the Reservation Identifier to the reservation in progress value ELSE IF The Reservation/Aloha Flag is set to reservation THEN Base station 24 sets the Reservation Identifier to the reservation in progress value ELSE Base station 24 sets the Reservation Identifier to the null value Detailed Description of Dynamic Access Control Procedures of the Present Invention An embodiment of dynamic access control methods and apparatus according to the present invention will now be described. As described previously, dynamic access control procedures are beneficial to control channel breakdown and recovery of multiple access channels which are subjected to variable traffic loads to thereby optimize the channel utilization under varying load conditions. The basic Aloha access method allows subscriber device 26 to unconditionally transmit an Aloha access burst in any slot. The dynamic access methods and apparatus of the present invention introduce a Probability of Transmission parameter, Ptx, that eliminates unconditional transmissions. For each transmission attempt, subscriber device 26 generates a random number between 0 and 1 (a fair die is preferred)(note that the random number need not be a binary value but may be a selectively large range of values, albeit fractional values, between 0 and 1). If this number is greater than the Ptx parameter that is broadcast in each forward channel block (see FIG. 11) by base station 24, transmission is permitted; otherwise subscriber device 26 does not transmit. Even though a transmission attempt was not made, the subscriber back-off algorithm is executed as if an unsuccessful transmission attempt was actually made. This causes subscriber device 26 to exceed the maximum number of transmission attempts threshold and discard the pending packet for a lower number of actual unsuccessful transmission attempts.

In essence, as the attempted traffic rate rises, the dynamic access methods and apparatus of the present invention will adjust the Ptx parameter so that an increasing number of transmission attempts are actually diverted away from the channel so as to maintain the actual channel attempt rate near unity so that optimal channel utilization can be achieved. This allows the channel utilization to be maintained during transients when the attempt rate due to new arrivals and the re-transmission of previously failed packets exceeds unity, or in situations when the arrival of new packets sustains a rate which is too high to be supported by the channel. This latter scenario is typical, for example, of the one-way paging busy hour just prior to noon in a radio based messaging and paging service environment. Using the methods and apparatus of the present invention, even in cells which are over-subscribed the channel will not lose revenue due to loss of channel utilization. Furthermore, in one embodiment, base station 24 reports the Ptx parameter to the Network Management system or controller 22 on a regular basis so the system provider may identify when cells are becoming capacity limited and where new cells should be provided.

Prior to a transmission attempt, controller 24 preferably selects a cell that enables the highest probability that a transmission will occur, that is the least busy cell, for the transmission. Furthermore, subscriber device 26 may elect to conserve battery power by not even attempting a transmission where the Probability of Transmission parameter indicates that a transmission attempt may be futile. The transmission attempt may be postponed to a later time when the channel is less busy.

The numerical precision of the Ptx parameter defines the accuracy to which the channel utilization can be controlled. High numerical precision theoretically would allow an Aloha channel utilization to be held at a perfect 36% for any stable attempt rate that exceeds unity. However, because the attempt rate varies as a function of the traffic profile, such precision is not typically warranted. Preferably, a 4-bit Ptx parameter is utilized which is broadcast by base station 24 and that defines a range of uniformly distributed probabilities over the range 0 to 1. Alternatively, for specialized traffic scenarios, the 4 bit index may be utilized to address a lookup table of 16 non-linear quantized Ptx values. Determination of the 16 values and whether they offer a sufficient control range is dependent upon each application/protocol. However, preferably the selection of each entry should correspond to a range of attempt rates (G) that result in a channel utilization (S) which varies by only a few percentage points.

Utilizing a transmission probability parameter Ptx that is an unsigned 4 bit binary integer (ranging 0–15), subscriber devices 26 are permitted to transmit if and only if a subscriber specific 4 bit unsigned random number (generated for each transmission attempt) is less than or equal to the transmission probability, Ptx. Ordinarily, the Ptx parameter is set to 15 indicating that all subscriber Aloha transmission attempts may proceed. However, if the population of subscriber devices 26 that source Aloha attempts increases to a sufficient rate, such that the reverse channel utilization falls below an optimal value, then base station 24 will adjust Ptx to ensure that only a supportable number of transmission attempts are permitted to occur. It is to be understood that the particular range of values used for Ptx is not critical but that the benefits of the present invention may be obtained with any value range in which subscriber device 26 selects one at random and only transmits if the selected number satisfies the broadcast criteria value from base station 24. In addition, specific subscriber devices 26 could be favored or disfavored by providing them a non-random selection of the value for comparison to the broadcast value.

Base station 24 preferably sets Ptx so that a percentage of the Aloha traffic is diverted prior to an actual transmission attempt. This allows base station 24 to maintain the channel utilization during peak traffic periods when the normal subscriber back-off rules are insufficient to prevent an Aloha collapse. This approach provides efficient utilization of the reverse channel but does disadvantage (deny access to) a segment of the subscriber device 26 population. The size of the disadvantaged population increases as Ptx is reduced. A base station 24 that sets Ptx to a value less than 15 for a significant duration of time may be identified as congested.

Figure 18:
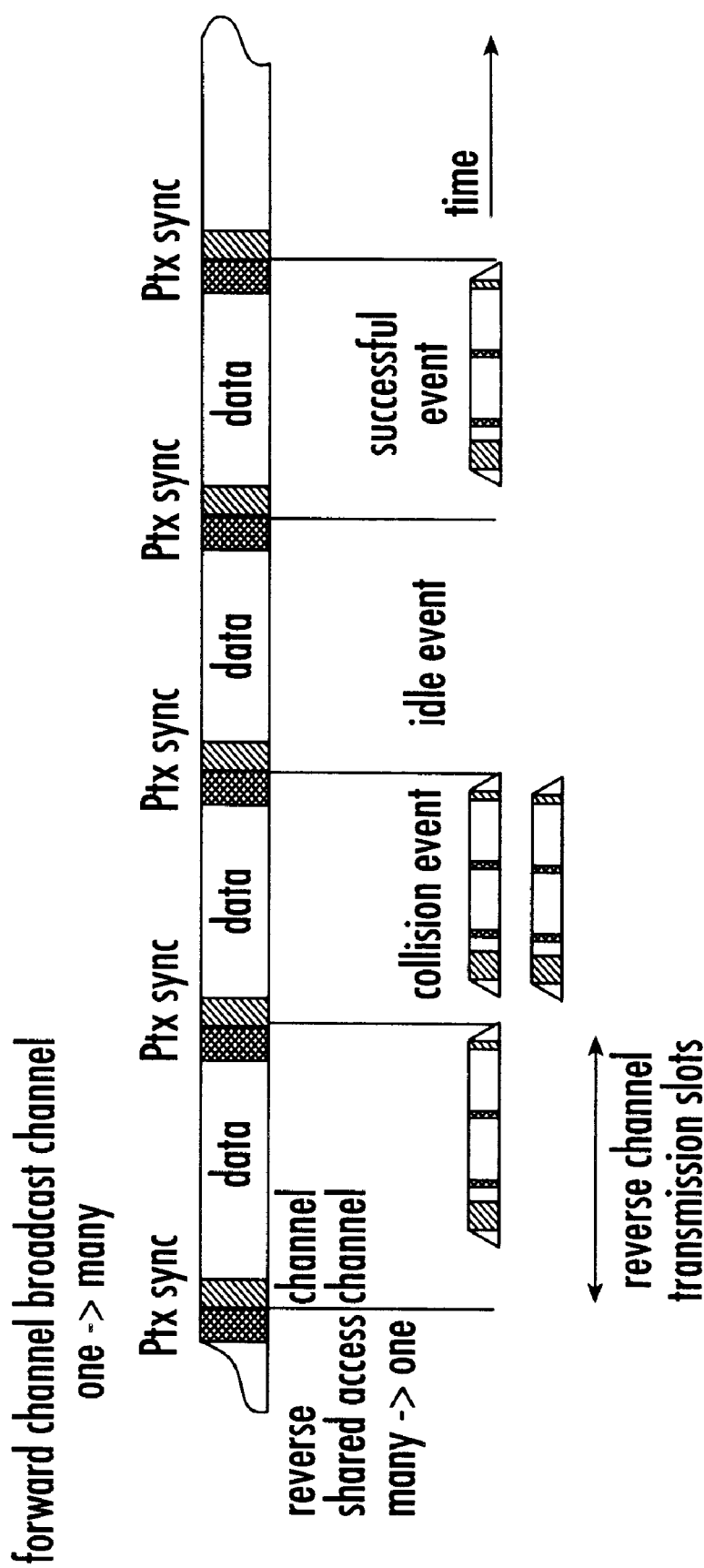
FIG. 18 schematically illustrates an embodiment of dynamic access control according to the present invention.

The Dynamic Access Control methods and apparatus of the present invention preferably provide that all subscriber devices 26 attempting to access the reverse channel must utilize the latest, that is most current, value of the Probability of Transmission parameter, Ptx, that has been estimated and broadcast on the forward channel by base station 24. Referring now to the embodiment illustrated in FIG. 18, the broadcast Ptx value is simply included in the data field of each forward channel Reed Solomon block. Alternatively, the broadcast PTx value may be included in the channel access status word as illustrated in FIG. 11.

Figure 19:
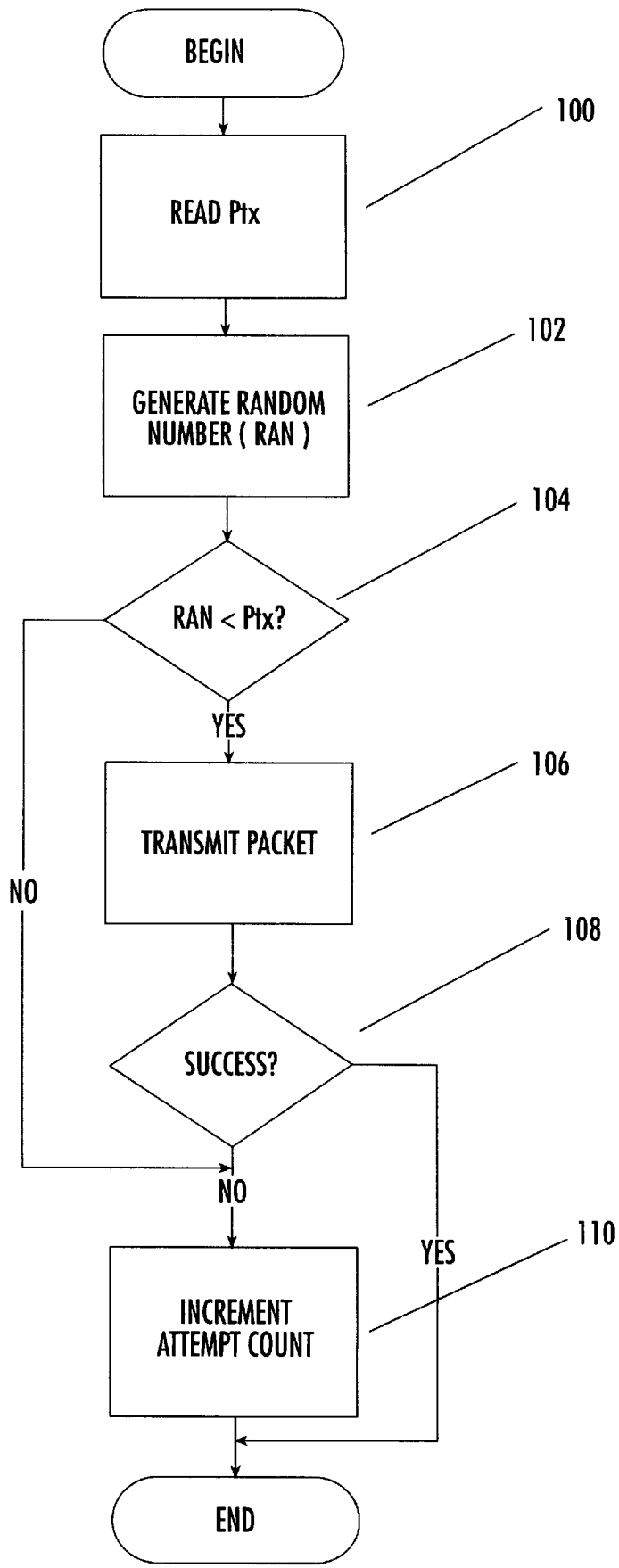
FIG. 19 is a flowchart illustrating operations for dynamic access control according to an embodiment of the present invention.

Referring now to FIG. 19, access procedures for subscriber device 26 according to an embodiment of the dynamic access methods and apparatus of the present invention will now be described. If subscriber device 26 has data packets to transmit then it is not permitted to make an unconditional transmission attempt as in a normal Aloha or existing contention based multiple access protocol. Instead, as illustrated at Block 100, subscriber device 26 obtains the latest value of the Probability of Transmission parameter, Ptx, that is broadcast on the forward channel. At Block 102, subscriber device 26 generates a random number which is drawn from the same number space as Ptx. If the random number exceeds the broadcast Ptx value at Block 104, the transmission attempt is permitted at Block 106. Otherwise, the transmission attempt is treated as an unsuccessfull transmission attempt. If a packet is transmitted at Block 106 and determined not to have transmitted successfully at Block 108 or if the random number does not exceed the Ptx value at Block 104 an attempt counter is incremented at Block 110 which is used in the back-off method as will be described. This causes an increasing number of transmission attempts to be aborted and packets to be discarded as the Ptx parameter is reduced. Reducing Ptx enables base station 24 to regulate the number of actual reverse channel transmission attempts.

Figure 20:
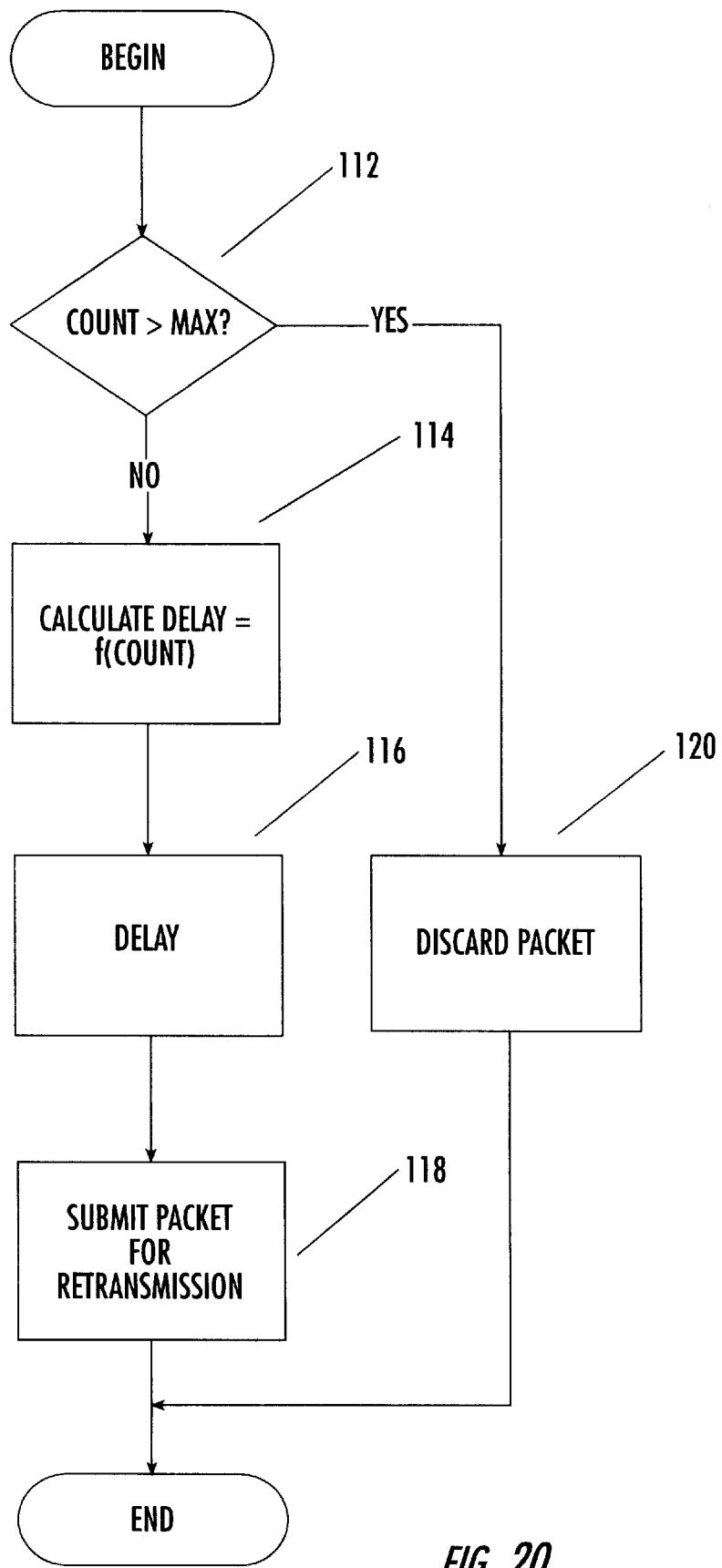
FIG. 20 is a flowchart illustrating back-off operations for use with the dynamic access control methods and apparatus of the present invention.

An embodiment of back-off methods suitable for use with the present invention are illustrated further in FIG. 20. As illustrated in FIG. 20, if the attempt count is less than or equal to the maximum retry count, a delay is calculated at Block 114 as a function of the attempt count. Transmission is then delayed for the calculated time as illustrated at Block 116. The packet is then submitted for transmission at Block 118. Preferably, prior to each re-transmission attempt (in the advent of a transmission failure), subscriber device 26 re-acquires the latest Ptx value that is broadcast on the forward channel and furthermore, generates a new random number to determine if the transmission attempt may proceed. If the maximum count is exceeded at Block 112, the packet is discarded (treated as unable to be transmitted) at Block 120.

An embodiment of a method for calculating the Ptx value according to the present invention will now be described with reference to FIG. 21. The following terms will be used in the description:

Ptx Transmission Probability, determines the rate of access by a population of subscriber devices 26.

Soptimal Optimal Aloha success rate experienced by base station 24 on the reverse channel (nominally 30%–40%). Soptimal is defined as the rate of successful Aloha bursts received during the Optimal Success Rate Update Window.

Scurrent The current Aloha success rate observed by base station 24 on the reverse channel (variable 0%–50%). Scurrent is defined as the rate of successful Aloha bursts received during the Ptx Adjustment Window.

Coptimal Estimated Aloha collision rate experienced by base station 24 on the reverse channel (nominally 20%–30%) during the same period that Soptimal is computed. Coptimal is defined as the rate of estimated Aloha collisions received during the Optimal Success Rate Update Window.

Ccurrent Estimated Aloha collision rate experienced by base station 24 on the reverse channel (nominally 0%–100%) during the same period that Scurrent is computed. Ccurrent is defined as the rate of estimated Aloha collisions received during the Ptx Adjustment Window.

Reduction Factor Rate of decay for Soptimal, the parameter determines the longevity for which a set of reverse channel conditions and traffic profiles are considered valid.

Exponent Determines the rate at which the Transmission Probability Ptx is updated.

Margin Defines a region of acceptable reverse channel utilization in which Ptx should not be adjusted.

Optimal Success

Rate Update Window Observation window defined by a specific number of Aloha slots, this window is used to estimate the channel parameters Scurrent and Ccurrent.

Ptx Adjustment Window Observation window defined by a specific number of Aloha slots. Ptx Adjustment Window<Optimal Success Rate Update Window.

Avg RSSI Defined as the average received signal strength indication associated with successful Aloha bursts.

Step Internal algorithm parameter, sets the rate of change of Ptx.

At Block 130, base station 24 monitors the reverse channel to determine successfully received packet and collision rates. The success and collision rates for the reverse channel are calculated at Block 132. Success rate may be determined by counting each block Aloha slot that successfully decodes. The associated reverse channel collision rate is not required to be an absolute estimate but is preferably a consistent estimate. The dynamic access methods and apparatus of the present invention are impervious to collision rate estimates that are constantly under or over estimated, but rely upon the underlying positive gradient monotonic behavior of the collision rate as the attempt rate increases. When utilized in a wireless packet system, the embodiment illustrated in FIG. 21 declares a collision to have occurred when any detection (Aloha) slot exhibits an average RSSI that exceeds the average successful RSSI parameter, yet fails to be successfully decoded. Preferably, base station 24 does not include decoding failures that may be attributed to co-channel interference or local oscillator leakage from subscriber devices 26 located close to base station 24 in determining the collision rate. When utilized in a wireline environment such as a wireless LAN, a collision is simply declared for each slot that fails to decode yet exhibits energy.

A predetermined optimal or acceptable success rate is defined for use at Block 134. The acceptable success rate is preferably determined by continually assessing the reverse channel conditions and determining the optimal success rate that can be supported by the reverse channel and the associated collision rate experienced by the reverse channel. In wireless systems, it is preferable that the system adapts to find the optimal success rate value rather than specifying a fixed theoretical value because the channel conditions may allow additional capacity to be realized through the capture effect or, alternatively, capacity may be lost due to intense co-channel interference from a neighboring system. The reduction factor ensures that long term statistics are not retained which may become obsolete as traffic and cell densities change. A prefered technique for determining the acceptable or optimal success rate for use at Block 134 is as follows:

compute $S_{current}$ and $C_{current}$ by averaging the number of successes and collisions over a duration specified by the Optimal Success Rate Update Window if (Scurrent>Soptimal)

then Soptimal=Scurrent

Coptimal=Ccurrent else Soptimal=max(Soptimal.Reduction Factor, 0.3)

The dynamic access methods and apparatus of the present invention assesses the reverse channel conditions and determine the reverse channel utilization. If the utilization of the reverse channel is lower than that offered by the estimated maximum, then the methods and apparatus of the present invention determine if this is due to a high incidence of reverse channel collisions causing an Aloha collapse or if it is simply due to a low attempt rate by the population of subscriber devices 26. In the event of very high reverse channel attempt rates, the probability of transmission parameter, Ptx, is reduced. Alternatively, if the attempt rate is low, Ptx is kept at a high value to encourage transmission and hence greater utilization of the available reverse channel.

If the success rate is determined not to be acceptable at Block 134, then a change rate or step size for adjusting the value of Ptx is determined at Block 136. The step size may be determined as a function of between the optimal and current success rates. For example, the step size may be set to the ratio of the optimal success rate to the current success rate raised to a selected EXPONENT value. However, it is to be understood that a variety of different methods for determining the step size may be beneficially used with the present invention.

If the collision rate is determined to be greater than a predetermined optimal or acceptable collision rate at Block 138, the value of Ptx is decreased by the step size from Block 136 at Block 140. Otherwise, the value of Ptx is increased by the step size from Block 136 at Block 142. If the success rate is determined to be acceptable at Block 134, the value of Ptx is not changed. At Block 144, Ptx is broadcast by base station 24 on the forward channel. If Ptx is broadcast as part of a channel control packet as described above, Block 144 corresponds to the broadcast of the channel control packet as illustrated at Block 80 in FIG. 9 (See also FIG. 11 incorporating Ptx in channel access status word). However, it is to be understood that the methods and apparatus of dynamic access control according to the present invention may be beneficially applied in a variety of contention based communications environments and are not limited to the inventive combined contention and reservation mode channel access methods and apparatus described herein. The operations of FIG. 21 may also be described for an embodiment of the present invention as follows:

compute $S_{current}$ and $C_{current}$ by averaging the number of successes and collisions over a duration specified by the Ptx Adjustment Window IF ($S_{current} < S_{optimal} +$ Margin)

$$\text{THEN} \quad Step = \left(\frac{Soptimal}{Scurrent}\right)^{EXPONENT}$$

IF (Ccurrent > Coptimal)

THEN Ptx = max(min_ Ptx, Ptx − Step)

ELSE Ptx = min(max_ Ptx, Ptx + Step)

ELSE Ptx = Ptx

Figure 21:
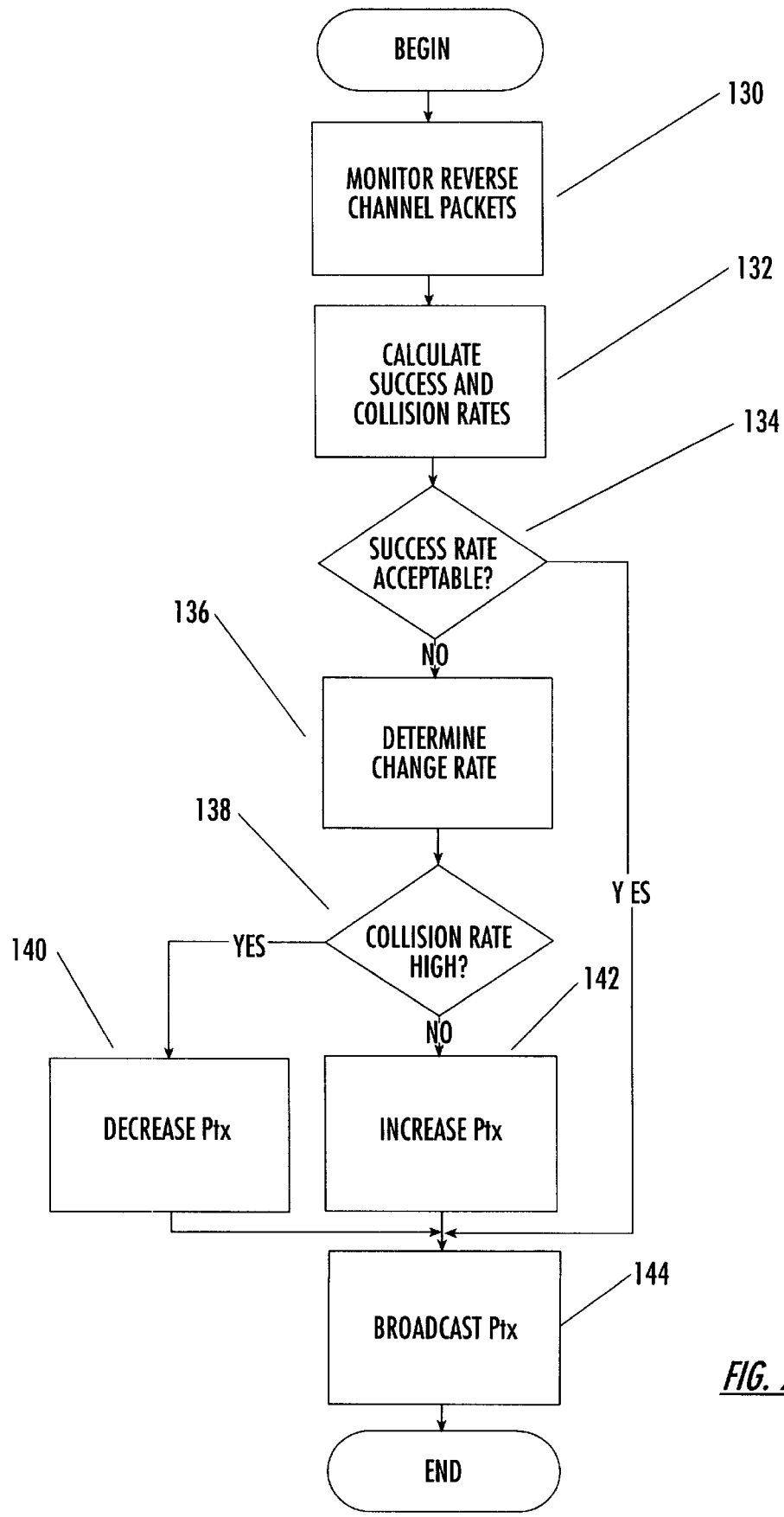
FIG. 21 is a flowchart illustrating operations for determination of a probability of transmission parameter for an embodiment of a dynamic access control method and apparatus according to the present invention.

While not illustrated in FIG. 21, the MARGIN parameter is utilized to prevent the probability of transmission parameter, Ptx, from dithering about its true value. Packet attempt rates are typically quite variable and fluctuations in the order of a few percentage points are quite normal. Consequently, the estimated collision and success rates will also fluctuate. The MARGIN parameter ensures that the Ptx parameter does not fluctuate. The EXPONENT parameter is utilized to determine the rate of change of the Ptx parameter. These parameters ensure that Ptx can be adjusted rapidly to a significant and sudden increase in the reverse channel attempt rate such as that which may be encountered just prior to the busy hour in a two-way messaging and paging system.

The dynamic access methods and apparatus of the present invention have been described herein as applied to a slotted Aloha system solely for the purpose of fully describing the invention. Preferred values for the parameters described above for such an environment are provided in the Table 1 below:

TABLE 1

| Parameter | Initial Value | Value |
|---|---|---|
| Soptimal | 0.36 | |
| Coptimal | 0.26 | |
| Reduction Factor | | 0.995 |
| Exponent | | 4 |
| Margin | | 0.9 |
| Optimal Success Rate Update Window | | last 512 Aloha slots |
| Ptx Adjustment Window | | last 128 Aloha slots |
| Avg RSSI | Determined from cell power product | |
| Ptx | 15 | |

State Diagram Description of Channel Access Procedures

Figure 22:
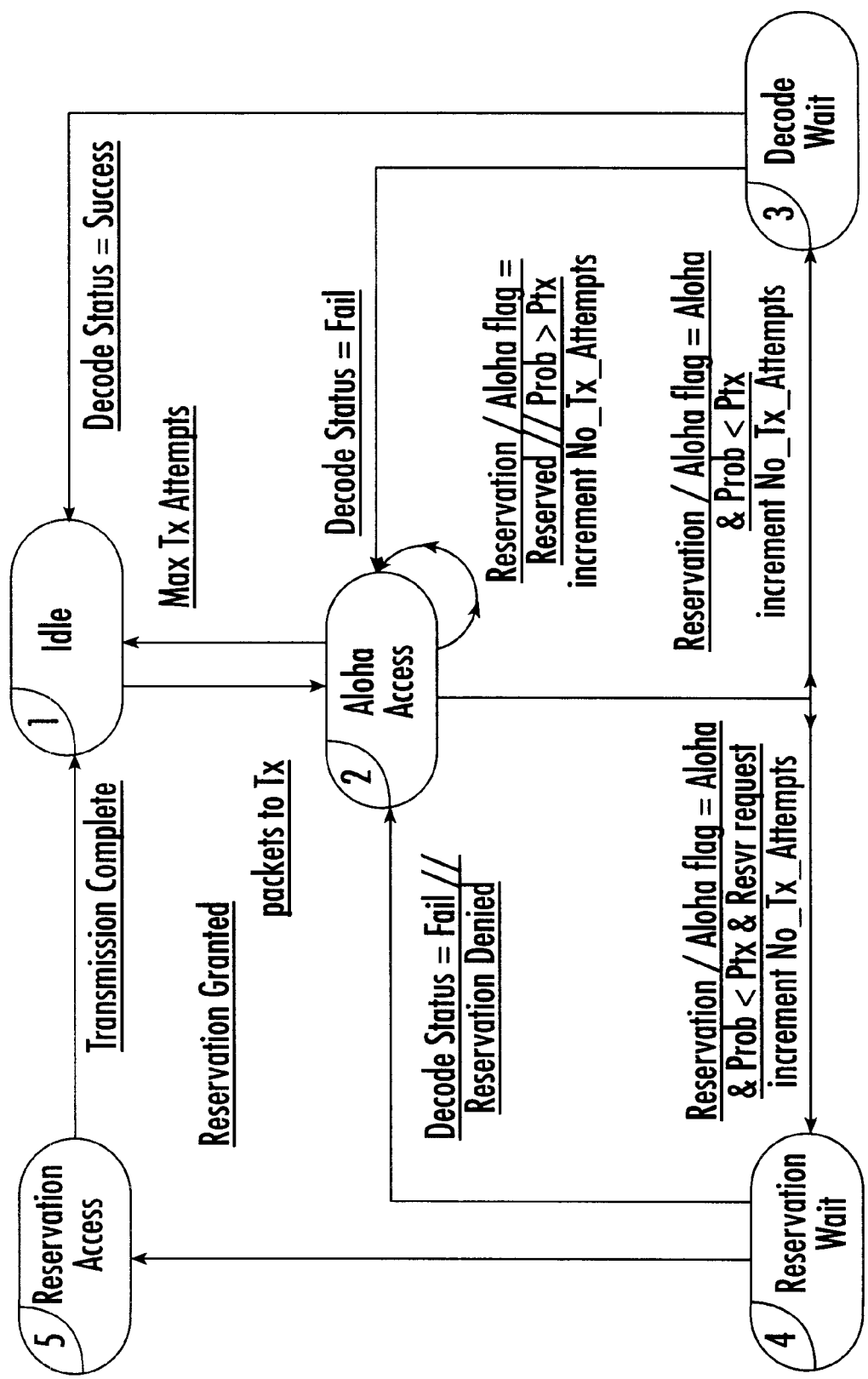
FIG. 22 is a state diagram for a subscriber device according to an embodiment of the present invention.

The basic state machine used by subscriber device 26 to control access to the reverse channel is shown in FIG. 22. Preferably, this procedure should not be violated when a congested forward channel is encountered. Utilization of the Transmission Probability, Ptx, parameter provides system stability during periods in which excess transmission attempts exceed the channel capacity.

If at any time the operation of this state machine is aborted, then all queued data packets are preferably discarded and error messages issued to the Data Link Layer entity indicating that the associated data packets were undeliverable.

Furthermore, if the number of transmission attempts in the Aloha Access State (2) exceeds the Max_Tx_Attempts threshold, then the channel stream is declared as congested and the transmission attempt is terminated. A transmission attempt consists of detecting and determining the value of the Reservation/Aloha flag while in the Aloha Access State (2).

IDLE STATE (1)

When the MAC layer of subscriber device 26 does not have data packets to transmit, it remains in the idle state (1). In this state the MAC layer entity does not attempt to access the reverse channel. Upon entry into the idle state (1) the MAC layer entity remains in the state for a minimum of Min_Idle_Time forward channel Reed Solomon block intervals. Min_Idle_Time is a system parameter that may be configured.

The MAC layer entity exits the idle state (1) and enters the aloha access state (2) on receipt of one or more data packets from the Data Link Entity. The MAC layer entity may, by implementation choice, decide to wait for a predetermined number of data packets to be queued or for an implementation specific time to elapse before a transmission is attempted. Furthermore, the subscriber MAC layer is only permitted to add additional data packets to the transmission queue while in the idle state (1).

Prior to exiting from the idle state (1), the subscriber MAC layer shall set a state variable of the No_Tx_Attempts to zero.

ALOHA ACCESS STATE(2)

Entry into the aloha access state (2) ordinarily occurs when the Data Link entity has outstanding data packets that require transmission. Alternatively, the aloha access state(2) can be entered due to an Aloha burst transmission failure or transmission attempt failure.

The subscriber MAC layer, upon receipt of data packets, assesses whether the data packets can be compressed to form a single Aloha transmission burst. Alternatively, the MAC layer will encode the data packets into a sequence of Reservation blocks and construct an Aloha reservation request burst indicating the exact number of reservation blocks for which reverse channel bandwidth should be allocated. Once the subscriber MAC layer has constructed an Aloha burst, it attempts to transmit the burst via the access procedures described herein.

If the state is re-entered due to an Aloha transmission failure or transmission attempt failure then subscriber device 26 delays transmission by implementing the back-off rules described previously. The back-off procedure is utilized to ensure that a repetition of the transmission failure does not occur if the failure was due to a channel collision between two or more subscriber devices attempting to utilize the same Aloha slot. The procedure randomizes subsequent access to the reverse channel.

An embodiment of the procedures governing access by subscriber device 26 will now be provided. For the purposes of these procedures subscriber device 26 maintains a counter that increments as each forward channel block is received. The procedure is as follows:

IF the subscriber MAC layer has outstanding data packets for transmission

THEN the subscriber will determine

IF the data packet(s) can be compressed into a single Aloha transmission burst

THEN the subscriber device forms a single Aloha transmission burst

ELSE the subscriber device encodes the data packet(s) to form a sequence of reservation blocks and forms an Aloha reservation request specifying the exact number of reservation blocks that are required to be allocated by the base station The subscriber MAC layer then selects at random a forward channel block interval in which the Aloha transmission burst will be transmitted. The forward channel block interval is selected between Min_Count and 2No_Tx_Attempts+1. The delayed block interval does not exceed Max_Count. This block interval is referenced as the $N^{th}$ forward channel block interval. During the (N−2)nd forward channel block interval the subscriber device shall examine the forward channel Reservation/Aloha flag, determine the transmission probability Ptx from the Channel Access Status word and generate a random number uniformly distributed between 0 and 15.

IF the Reservation/Aloha flag indicates Aloha and the subscriber MAC layer has a queued Aloha transmission burst and the random number is less than the transmission probability Ptx THEN the subscriber device transmits in one of the three available Aloha slots (selected at random) during the Nth forward channel block interval, increments the No_Tx_Attempts state variable and enters the decode wait state (3)

ELSE IF the Reservation/Aloha flag indicates Aloha and the subscriber MAC layer has a queued Aloha reservation request and the random number is less than the transmission probability Ptx THEN the subscriber device transmits in one of the three available Aloha slots (selected at random) during the $N^{th}$ forward channel block interval, increments the No_Tx_Attempts state variable and enters the reservation wait state (4)

ELSE IF the No_Tx_Attempts exceeds Max_Tx_Attempts

THEN the subscriber device discards all outstanding data packet(s), issues an error message to the Data Link entity indicating that the outstanding data packets were undeliverable and enters the idle state (1)

ELSE IF the entrance delay exceeds Max_Entrance Delay

THEN the subscriber device discards all outstanding data packet(s), issues an error message to the Data Link entity indicating that the outstanding data packets were undeliverable and enters the idle state (1)

ELSE the subscriber device aborts the transmission attempt, increment the No_Tx_Attempts state variable and re-enters the aloha access state (2)

DECODE WAIT STATE (3)

When the subscriber MAC layer entity is in the decode wait state(3) it attempts to determine the success of the previous Aloha transmission. For the purposes of these procedures subscriber device 26 maintains a counter that increments as each forward channel block is received. Subscriber device 26 examines the Decode Status that is encoded and transmitted in the $N^{th}$ forward channel block and execute the following procedures.

IF the subscriber device transmitted an Aloha burst in one of three available Aloha slots in the (N−2)$^{nd}$ forward channel block interval THEN the subscriber device examines the corresponding decode status bit in the channel access status word embedded in the N$^{th}$ forward channel block IF the decode status indicates that the subscriber Aloha transmission was successful THEN the subscriber device enters the idle state (1)

ELSE IF the decode status indicates that the subscriber Aloha transmission was unsuccessful THEN the subscriber device enters the aloha access state (2)

ELSE IF the forward channel block cannot be decoded due to an impaired block

THEN the subscriber device examines the corresponding decode status bit in the channel access status word embedded in the (N+1)st forward channel block IF the decode status indicates that the subscriber Aloha transmission was successful THEN the subscriber device enters the idle state (1)

ELSE IF the decode status indicates that the subscriber Aloha transmission was unsuccessful THEN the subscriber device enters the aloha access state (2)

ELSE the decode status is indeterminate due to two concurrent forward channel block errors THEN the subscriber device issues an error message to the Data link layer indicating that a potentially unsuccessful transmission of the data packets has occurred and enters the idle state (1)

RESERVATION WAIT STATE (4)

When the subscriber MAC layer entity is in the reservation wait state(3) it attemps to determine the success of the previous Aloha reservation request transmission burst. For the purposes of these procedures subscriber device 26 maintains a counter that increments as each forward channel block is received. Subscriber device 26 examines the Reservation/Aloha Flag, Reservation Identifier and Decode Status that is encoded and transmitted in the N$^{th}$ forward channel Reed Solomon block and execute the following procedures.

IF the subscriber device transmitted an Aloha reservation request in one of three available Aloha slots in the (N−2)nd forward channel block interval THEN the subscriber device examines the Reservation/Aloha flag and the Reservation Identifier in the N$^{th}$ forward channel block IF the subscriber device determines that the Reservation/Aloha flag is set to reservation and the Reservation Identifier matches the device reservation identifier THEN the subscriber device enters the transmit reservation access state (5)

ELSE IF the system is operating in Mode 1 or Mode 2.

THEN the subscriber device enters the aloha access state (2).

ELSE the system is operating in Mode 0 or Mode 3 and the subscriber device examines the corresponding decode status bit in the channel access status word embedded in the Nth forward channel block.

IF the forward channel block cannot be decoded due to an impaired block

THEN the subscriber device examines the decode status bits in the channel access status word embedded in the (N+1)$^{st}$ forward channel block IF the decode status indicates that the subscriber Aloha transmission was successful THEN the subscriber device examines the Reservation/Aloha flag and Reservation Identifier in each subsequent forward channel block.

IF the subscriber device determines that the Reservation/Aloha flag is set to reservation and the Reservation Identifier matches the device reservation identifier THEN the subscriber device enters the transmit reservation access state (5)

ELSE IF the subscriber device determines that the Reservation/Aloha flag is set to indicate Aloha access and the Reservation Identifier is set to the null value THEN the subscriber device enters the aloha access state (2)

ELSE the decode status indicates that the subscriber Aloha transmission was unsuccessful and the subscriber device enters the aloha access state (2).

TRANSMIT RESERVATION ACCESS STATE (5)

Upon initial entry into the transmit reservation access state (5), the subscriber MAC layer entity waits for two forward channel block durations prior to transmission. During transmission, the subscriber MAC layer entity does not add additional data packets to the transmission queue. When all data packets have been transmitted, the subscriber MAC layer entity enters the idle state(1). For the purposes of these procedures, subscriber device 26 maintains a counter than increments as each forward channel block is received. The procedures governing this procedure are detailed below.

IF the subscriber device determined that the Reservation Identifier in the N$^{th}$ forward channel block matched the subscriber reservation identifier THEN the subscriber device transmits a contiguous set of blocks; the first block will be transmitted during the (N−2)$^{nd}$ forward channel block interval. The number of transmitted blocks is identical to the number of blocks requested in the Aloha reservation request transmission. The transmitted reservation blocks contain the data packets.

IF the subscriber device has completed transmission of the reservation blocks

THEN the subscriber device enters the idle state(1).

Figure 23:
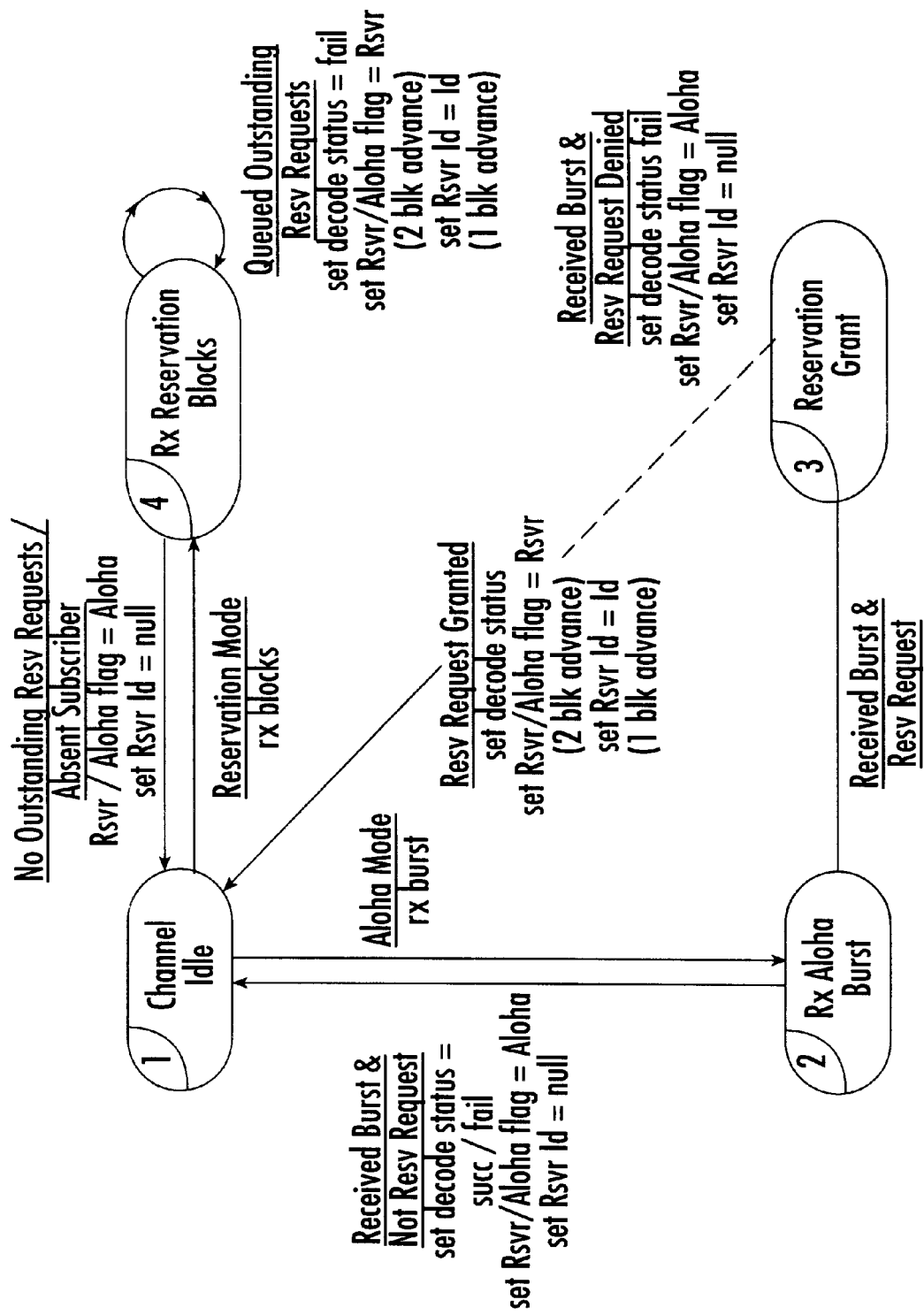
FIG. 23 is a state diagram for a base station according to an embodiment of the present invention.

The basic state machine used by base station 24 for controlling access to the reverse channel by the population of subscriber devices 26 is illustrated in the state diagram of FIG. 23. The setting of the Reservation/Aloha flags and the Reservation Identifier occurs at the correct block boundaries.

CHANNEL IDLE STATE (1)

Initially, base station 24 sets the Reservation/Aloha flag to indicate that Aloha transmission bursts may be received, sets the Reservation Identifier to the null value, and enters the channel idle state (1). Base station 24 remains in the channel idle state (1) until a forward channel block boundary is reached:

IF the base station determines that one or more reservation requests are queued for pending service and that the Reservation/Aloha flag has been set to reservation for the previous two forward channel Reed Solomon blocks THEN the base station enters the receive reservation blocks state (4)

else the base station enters the receive aloha bursts state (3)

RECEIVE ALOHA BURSTS STATE (2)

Base station 24 remains in the receive aloha bursts state (3) for the duration of the forward channel block period. During this time interval, base station 24 examines in turn each of the three reverse channel Aloha slots for the existence of an Aloha burst from a subscriber device 26. For each Aloha slot, base station 24 attempts to demodulate and detect an Aloha burst.

IF an Aloha burst is received error free or is successfully corrected

THEN the base station sets the corresponding decode status bits to indicate success The base station 24 examines all received and correctly decoded Aloha bursts for a MAC layer reservation request or a data packet. Reservation requests and the associated subscriber reservation identifications will be stored. Base station 24 remains in the receive aloha bursts state (3) until all three Aloha slots have been examined for the existence of a subscriber device 26 originated transmission:

IF the base station has examined all three Aloha slots and one or more reservation requests have been received THEN the base station enters the reservation grant state (3)

ELSE the base station returns to the channel idle state (1)

RESERVATION GRANT STATE (3)

While in the reservation grant state (3) base station 24 examines the list of reservation requests:

IF the base station is currently operating in Mode 0

THEN the base station executes system specific procedures

ELSE IF the base station is operating in Mode 1 (Aloha only)

THEN the base station ignores the reservation request and sets the corresponding decode status bits to failure ELSE IF the base station is operating in Mode 2 (Aloha and Serve One Reservation at Random)

THEN the base station examines the reservation queue

IF one reservation request is already pending service and the base station has previously acknowledged the request THEN the base station discards all reservation requests received in the previous three Aloha slots and sets the corresponding decode status bits for each received reservation request to failure ELSE the base station selects from the remaining reservation requests one reservation identifier at random Sets the forward channel Reservation Identifier to match the chosen subscriber and the Reservation/Aloha flag to reservation Sets the corresponding decode status bits associated with the selected reservation request to success Sets the decode status bits for each received reservation request that is not selected to failure ELSE IF the base station is operating in Mode 3 (Aloha and Queued Reservations)

THEN the base station appends the reservation request(s) to the reservation queue Sets the decode status bits associated with each reservation request to success Sorts the reservation queue so that reservation requests for shorter reverse channel transmissions are served in preference to longer reservation requests Sets the forward channel Reservation Identifier to match the first subscriber in the reservation queue and the Reservation/Aloha flag to reservation On completion of the above procedures the base station enters the channel idle state (1)

RECEIVE RESERVATION BLOCKS STATE (4)

While in the receive reservation blocks state (4) base station 24 attempts to detect and synchronize to the reverse channel subscriber device 26 transmission of reservation blocks. The transmission from subscriber device 26, if present, includes an embedded synchronization sequence that is present in each of a predetermined number of reservation blocks. The number of blocks will be identical to that requested in the initial reservation request and allocated by base station 24.

IF the base station acquires synchronization with a reverse channel transmission THEN the base station attempts to decode a reservation block for each allocated block that has been reserved Procedures for Mode 2 (Aloha and Serve One Reservation at Random) Operation.

IF the base station is operating in Mode 2 and has successfully acquired synchronization with the subscriber transmission THEN two blocks prior to the completion of the subscriber transmission the base station sets the Reservation/Aloha flag to Aloha and sets the Reservation Identifier to the null value On completion of the subscriber transmission the base station enters the channel idle state (1).

Procedures for Modes 1 and 3 (Aloha and Queued Reservations) Operation.

IF the base station is operating in Mode 3 and has successfully acquired synchronization with the subscriber transmission THEN two blocks prior to the completion of the subscriber transmission the base station re-examines the reservation queue IF the reservation queue is empty THEN the base station sets the Reservation/Aloha flag to Aloha and sets the Reservation Identifier to the null value On completion of the subscriber transmission the base station enters the channel idle state (1).

ELSE the base station sets the Reservation Identifier to the identification value of the next subscriber device in the reservation queue and remains in the receive reservation blocks state (4)

IF the base station is operating in Mode 3 and determines in an implementation dependent manner that the subscriber transmission is absent THEN the base station maintains the Reservation/Aloha flag indicating reservation, sets the Reservation Identifier to the identification value of the next subscriber device in the reservation queue and remains in the receive reservation blocks state (4)

System Stability

Figure 24:
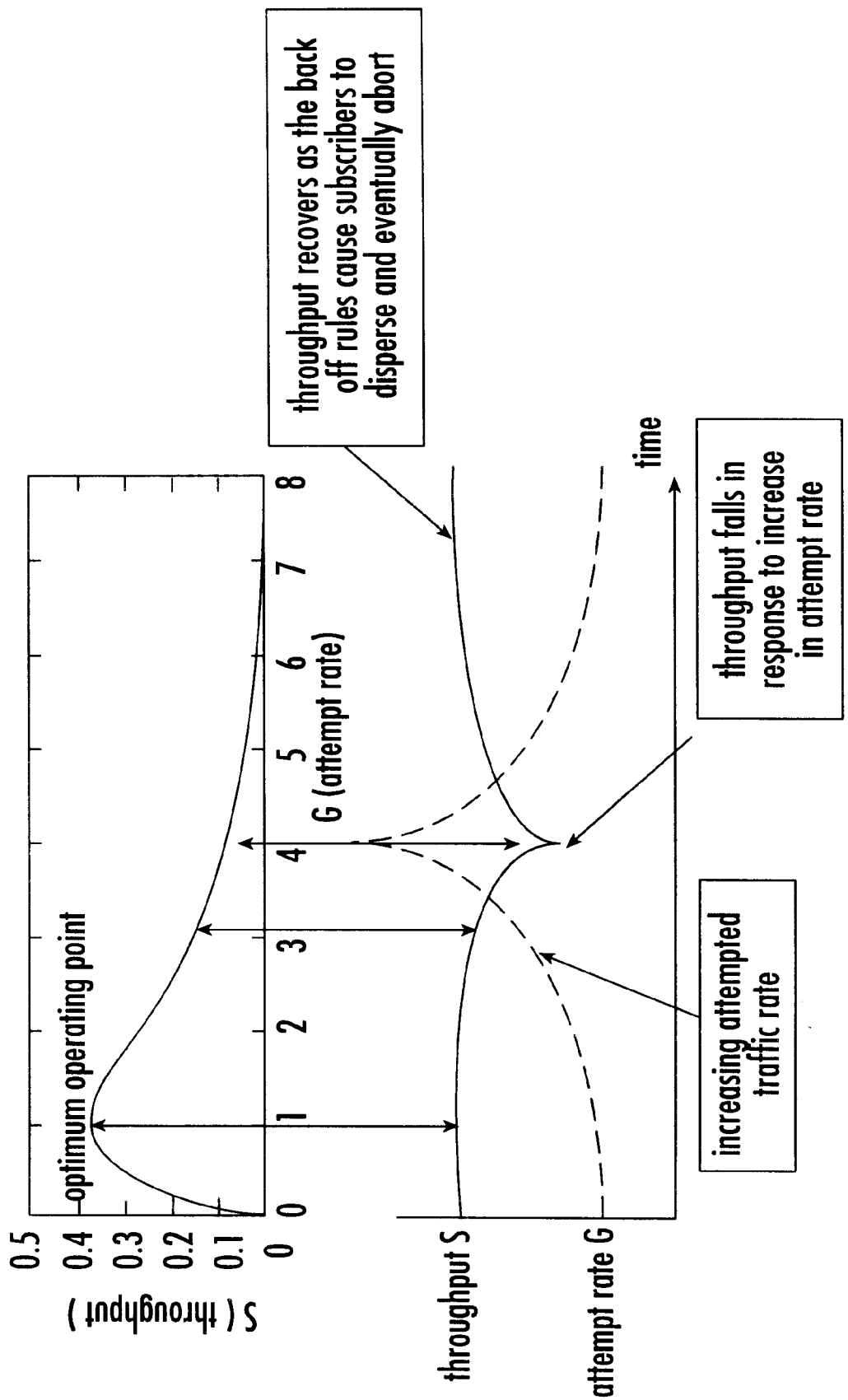
FIG. 24 schematically illustrates operations over time for an Aloha system with back-off rules providing recovery.

The benefits of the present invention may further be understood in the context of Aloha system performance. The dynamics of the stability issue may be revealed if the throughput versus attempt rate response (S vs. G curve) of an existing slotted Aloha system is considered, as illustrated in FIG. 24. Misinterpretation of the system's performance occurs because it would appear that provided the attempt rate (G) is kept below unity, the channel utilization (S) would appear acceptable and stable. Unfortunately this static interpretation is flawed because it does not reflect the time based dynamic behavior of the system. The Aloha system is stable if and only if the departure rate is equal to the arrival rate. Consider the scenario when the attempt rate is unity. For every 10 transmission attempts, approximately 3 are successful. The 7 unsuccessful packets will become queued for re-transmission. During a subsequent time interval in which another 10 transmission attempts are executed, only 3 transmission attempts may correspond to new packets that have arrived if stability is to be achieved. If less than 3 new packets arrive, the operating point on the Aloha response curve will drift to the left and the channel utilization will fall. This is a satisfactory occurrence because although the channel is not being utilized at its maximum, the delay experienced with the delivery of each packet is negligible and the system appears to provide excellent service to all users. However, if the number of new arrivals exceeds 3, the number of transmission attempts in a subsequent interval of time will exceed 10 and, as a consequence, an increase in the number of collisions will be observed. This will cause the number of successful transmissions to fall, which results in a decrease in channel utilization and a further increase in the number of attempted re-transmissions during a subsequent time slot. Consequently, the operating point to drifts to the right of the optimum operating point. If the new arrival rate continues to exceed the successful departure rate then the operating point will continue to drift to the right. This is a highly undesireable scenario because the channel utilization falls and, as a consequence, so does the level of revenue-bearing traffic. The delay associated with the delivery of each packet dramatically increases and the quality of the system that is perceived by the users falls. This scenario is often referred to as an Aloha or Reverse channel collapse.

To prevent Aloha instability, a subscriber device is only permitted to re-transmit each packet a finite number of times. Furthermore, each re-transmission is required to be delayed by an exponentially increased delay. It is important to realize that this back off policy does not eliminate the possibility that system instability can occur; rather the possibility is significantly reduced. Furthermore, if the channel utilization does fall because the attempt rate has exceeded the maximum that the system can support, then the back off policy provides a mechanism for recovery if instability occurs. The stability issue is normally addressed by providing back off rules, such as:

IF a transmission attempt fails
  THEN the subscriber device will delay a subsequent transmission attempt by a random time interval
IF the number of transmission attempts exceeds a predetermined threshold
  THEN the subscriber device will discard the queued packet and abort the transmission attempt The first rule minimizes the possibility that two or more subscriber devices will execute re-transmission attempts after an initial collision in an identical time slot. This approach provides an effective splitting algorithm that prevents continuous repeating collisions but it does not reduce the actual attempted traffic. The second rule provides a form of non-persistence which allows the system to recover and the operating point to actually drift left towards the desirable operating region. The rule effectively increases the departure rate, and departures are now partitioned between those that are successfully transmitted and those that are abandoned. The non-persistence rule introduces a change in the system behavior. Referring now to FIG. 24, if the system is operating at the optimum operating point and the successful departure rate is matched by the attempted traffic of both new arrivals and re-transmissions, then the operating point will remain at this position. If a transient increase in the attempted traffic rate occurs, then the operating point will drift to the right and the channel utilization will fall. If the rate of new arrivals decays to the original rate, the non-persistence rule will slowly flush the excess packets queued for transmission and the operating point will recover and drift left towards the optimum operating point.

Figure 25:
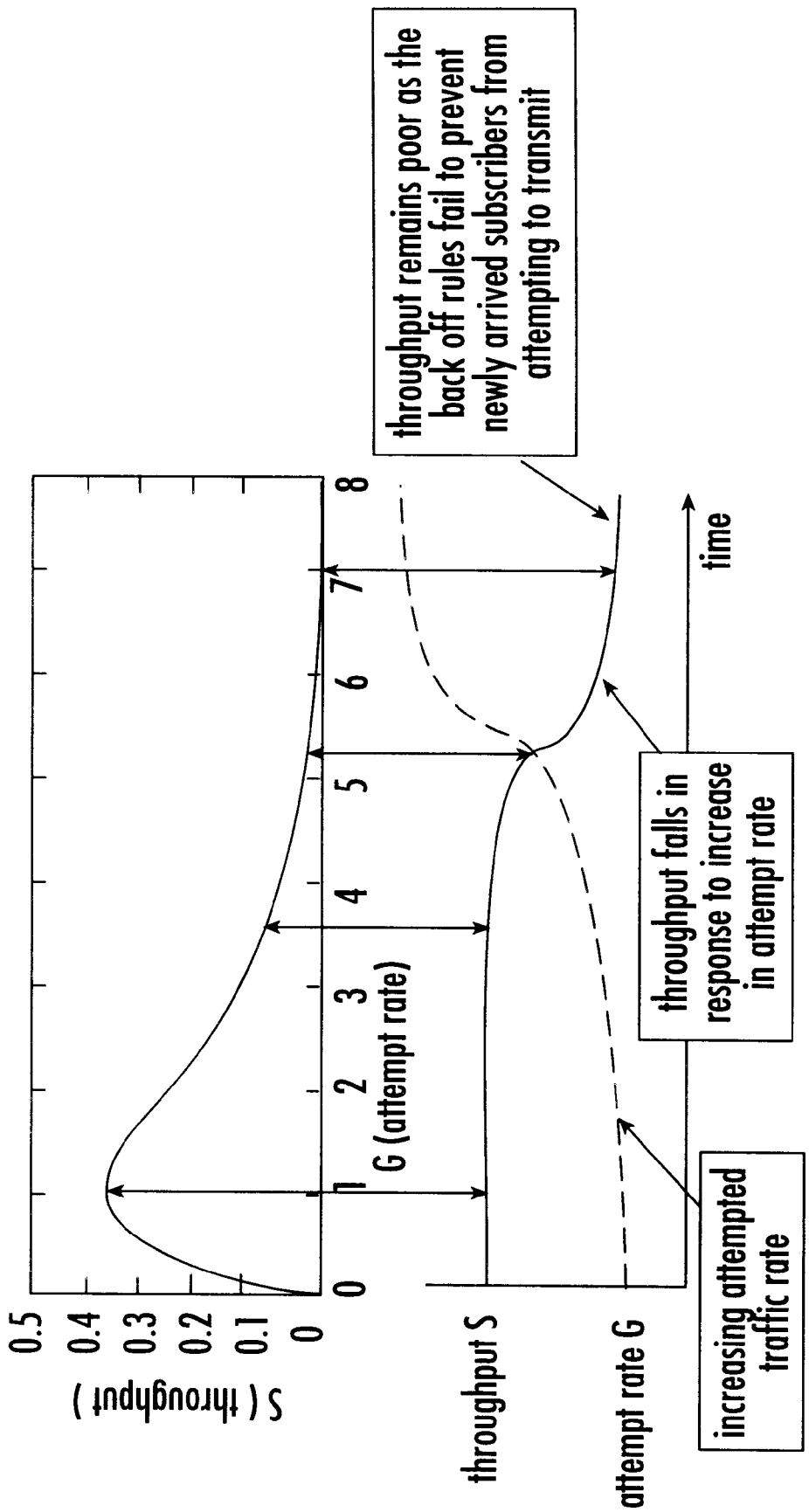
FIG. 25 schematically illustrates operations over time for an Aloha system where back-off rules fail to provide for recovery.

The above stabilization procedure is typically only viable in systems where the contribution to the attempted traffic from new arrivals is essentially steady, predictable and sufficiently low so that the total attempted traffic rate can remain at or below unity. The technique can control short term transient increases in the arrival rate, which are assumed to be infrequent, and the associated loss in channel utilization can be tolerated. FIG. 25 illustrates a scenario in which this stabilization technique fails. If the number of new arrivals exceeds the departure rate (both successful and aborted) then the operating point will continue to drift to the right. This scenario could quite easily occur for a two-way paging and messaging system utilizing Aloha during the busy hour Oust prior to lunch) in an over subscribed downtown cell. Despite the fact that the channel is incapable of supporting the traffic volume, it would be desirable for the channel to be utilized effectively by a subset of the subscriber population so that the service provider could still generate a revenue-bearing traffic stream. This capability is provided by the dynamic access methods and apparatus of the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A dynamic access control method for a multiple access communication network having a forward channel and a reverse channel comprising the steps of:

receiving transmitted packets on the reverse channel;

determining if the received packets were received without error;

generating a dynamic access control parameter for regulating access to the reverse channel based on whether the received packets were received without error;

broadcasting a channel control packet including the dynamic access control parameter on the forward channel; and wherein said step of generating a dynamic access control parameter includes the following steps:

determining a transmission success rate and a transmission collision rate for the communication network;

establishing a change rate for the dynamic access control parameter if the determined success rate is below a predetermined value;

establishing a change direction for the dynamic access control parameter based on the collision rate; and generating the dynamic access control parameter based on the established change rate and change direction.

2. The dynamic access control method of claim 1 wherein the following steps are performed following said step of broadcasting a channel control packet:

receiving the broadcast channel control packet;

reading the dynamic access control parameter in the received channel control packet;

generating an access control limit value; and submitting a packet for transmission if the generated access control limit value satisfies the dynamic access control parameter.

3. The dynamic access control method of claim 2 wherein the following steps are performed following said step of submitting a packet for transmission:
   incrementing a packet transmission attempt count; and
   transmitting the packet if the attempt count is no greater than a maximum attempt count.

4. The dynamic access control method of claim 2 wherein said step of generating an access control limit value includes the step of generating the access control limit value based on a random number function.

5. The dynamic access control method of claim 2 wherein the change rate is a function of the determined success rate and a target success rate and the change direction is a function of the determined collision rate and a target collision rate.

6. The dynamic access control method of claim 2 wherein the communication network is a wireless network.

7. The dynamic access control method of claim 6 wherein the wireless network is a cellular network.

8. The dynamic access control method of claim 2 wherein the communication network is a wireline network.

9. A dynamic access control method for a reverse channel transmission apparatus in a multiple access communication network having a forward channel and a reverse channel comprising the steps of:
   receiving a broadcast channel control packet including a dynamic access control parameter;
   reading the dynamic access control parameter in the received channel control packet;
   generating an access control limit value;
   submitting a packet for transmission if the generated access control limit value satisfies the dynamic access control parameter;
   incrementing a packet transmission attempt count;
   determining a transmission delay time; and,
   transmitting the packet after waiting the determined transmission delay time if the attempt count is no greater than a maximum attempt count.

10. A forward channel transmission apparatus for use in a multiple access communication network having a forward channel and a multiple access reverse channel, the apparatus comprising:
   means for receiving transmitted packets on said reverse channel;
   means for determining if said received packets were received without error;
   means for generating a dynamic access control parameter for regulating access to said reverse channel based on whether said received packets were received without error;
   means for broadcasting a channel control packet including the dynamic access control parameter on the forward channel; and
   wherein said generating means includes:
      means for determining a transmission success rate and a transmission collision rate for said communication network;
      means for establishing a change rate for said dynamic access control parameter if said success rate is below a predetermined value;
      means for establishing a change direction for said dynamic access control parameter based on said collision rate; and
   means for generating said dynamic access control parameter based on said change rate and said change direction.

11. The forward channel transmission apparatus of claim 10 wherein said change rate is a function of said transmission success rate and a target success rate and said change direction is a function of said transmission collision rate and a target collision rate.

12. A reverse channel transmission apparatus for use in a multiple access communication network having a forward channel including a broadcast channel control packet, said channel control packet including a dynamic access control parameter, said communication network further having a multiple access reverse channel, the apparatus comprising:
   receiving means for receiving said broadcast channel control packet;
   reading means for reading said dynamic access control parameter in said received channel control packet;
   generating means for generating an access control limit value;
   submitting means for submitting a packet for transmission if said access control limit value satisfies said dynamic access control parameter;
   means for incrementing a packet transmission attempt count;
   means for determining a transmission delay time; and,
   means for transmitting a packet after waiting said transmission delay time if said attempt count is no greater than a maximum attempt count.

13. The reverse channel transmission apparatus of claim 12 wherein said generating means includes means for generating said access control limit value based on a random number function.

* * * * *

UNITED STATES PATENT AND TRADEMARK OFFICE
CERTIFICATE OF CORRECTION

PATENT NO.    : 6,078,568
DATED         : June 20, 2000
INVENTOR(S)   : Andrew S. Wright; Cuong Hon Lai Page 1 of 1

It is certified that error appears in the above-identified patent and that said Letters Patent is hereby corrected as shown below:

Under References Cited, please add the following references that were considered but not listed:

| | | | |
|---|---|---|---|
| 4,736,371 | 4/1988  | Tejima et al.   | 370/443     |
| 4,928,096 | 5/1990  | Leonardo et al. | 340/825.440 |
| 5,384,777 | 1/1995  | Ahmadi et al.   | 370/85.2    |
| 5,553,076 | 9/1996  | Behtash et al.  | 370/95.3    |
| 5,648,958 | 7/1997  | Counterman      | 370/458     |
| 5,931,964 | 8/1999  | Beming et al.   | 714/748     |
| 5,963,557 | 10/1999 | Eng             | 370/432     |

Signed and Sealed this

Nineteenth Day of June, 2001

Attest:

Attesting Officer

NICHOLAS P. GODICI
Acting Director of the United States Patent and Trademark Office